(12) United States Patent
Nabatchian et al.

(10) Patent No.: US 11,815,897 B2
(45) Date of Patent: Nov. 14, 2023

(54) METHOD AND SYSTEM FOR GENERATING AN IMPORTANCE OCCUPANCY GRID MAP

(71) Applicants: Amirhosein Nabatchian, Maple (CA); Ehsan Taghavi, Toronto (CA)

(72) Inventors: Amirhosein Nabatchian, Maple (CA); Ehsan Taghavi, Toronto (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 801 days.

(21) Appl. No.: 16/871,711

(22) Filed: May 11, 2020

(65) Prior Publication Data
US 2021/0347378 A1    Nov. 11, 2021

(51) Int. Cl.
| | |
|---|---|
| G05D 1/02 | (2020.01) |
| B60W 60/00 | (2020.01) |
| G06T 7/20 | (2017.01) |
| G06V 20/56 | (2022.01) |
| G06F 18/25 | (2023.01) |
| G06F 18/214 | (2023.01) |
| G06V 10/82 | (2022.01) |

(Continued)

(52) U.S. Cl.
CPC ......... G05D 1/0214 (2013.01); B60W 60/001 (2020.02); G05D 1/0221 (2013.01); G05D 1/0278 (2013.01); G06F 18/214 (2023.01); G06F 18/25 (2023.01); G06T 7/20 (2013.01); G06V 10/82 (2022.01); G06V 20/56 (2022.01); B60W 2556/50 (2020.02); G01S 17/42 (2013.01); G01S 17/931 (2020.01); G06T 2207/10028 (2013.01); G06T 2207/20081 (2013.01); G06T 2207/20084 (2013.01); G06T 2207/30241 (2013.01); G06T 2207/30252 (2013.01)

(58) Field of Classification Search
None
See application file for complete search history.

(56) References Cited

U.S. PATENT DOCUMENTS

2018/0335307 A1* 11/2018 Chen .................. G01C 21/3815
2020/0355820 A1* 11/2020 Zeng ..................... G01S 13/865

(Continued)

FOREIGN PATENT DOCUMENTS

| CN | 107577231 A | 1/2018 |
|---|---|---|
| CN | 108303101 A | 7/2018 |

(Continued)

OTHER PUBLICATIONS

Fast and Furious: Real Time End-to-End 3D Detection, Tracking and Motion Forecasting with a Single Convolutional Net, Wenjie Luo, Bin Yang, Raquel Urtasun, IEEE/CVF CVPR, 2018 2018.

(Continued)

*Primary Examiner* — Adam D Tissot
*Assistant Examiner* — Garrett F Evans

(57) ABSTRACT

A system and method for generating an importance occupancy grid map (OGM) for a vehicle are disclosed. The method includes: receiving a three-dimensional (3D) point cloud; receiving a binary map, the binary map associated with a set of GPS coordinates of the vehicle; receiving information representative of a planned path for the vehicle; and generating an importance OGM based on the 3D point cloud, the binary map, and the planned path for the vehicle using a map generation module.

16 Claims, 11 Drawing Sheets

(51) Int. Cl.
  *G01S 17/42* (2006.01)
  *G01S 17/931* (2020.01)

(56) References Cited

U.S. PATENT DOCUMENTS

2021/0139007 A1* 5/2021 Wijffels ............... G05D 1/0891
2021/0239799 A1* 8/2021 Friend .................... G01S 17/89

FOREIGN PATENT DOCUMENTS

| CN | 108775902 A | 11/2018 |
| CN | 109059942 A | 12/2018 |
| CN | 110896482 A | 3/2020 |
| EP | 3627250 A1 | 3/2020 |

OTHER PUBLICATIONS

Casas S, Luo W, Urtasun R. Intentnet: Learning to predict intention from raw sensor data. InConference on Robot Learning Oct. 23, 2018 (pp. 947-956) 2018.

Phillips, Derek J., Tim A. Wheeler, and Mykel J. Kochenderfer. "Generalizable intention prediction of human drivers at intersections." 2017 IEEE Intelligent Vehicles Symposium (IV) IEEE, 2017. 2017.

Zhou, Yin, and Oncel Tuzel. "Voxelnet: End-to-end learning for point cloud based 3d object detection." Proceedings of the IEEE Conference on Computer Vision and Pattern Recognition. 2018. 2018.

Ku, Jason, et al. "Joint 3d proposal generation and object detection from view aggregation." 2018 IEEE/RSJ International Conference on Intelligent Robots and Systems (IROS). IEEE, 2018 2018.

Wu, Bichen, et al. "Squeezesegv2: Improved model structure and unsupervised domain adaptation for road-object segmentation from a lidar point cloud." 2019 International Conference on Robotics and Automation (ICRA). IEEE, 2019 2019.

* cited by examiner 910 receiving a plurality of sets of input training data and a plurality of training maps across consecutive timeframes 930 for each timeframe $t_i$, where $i = \{-n, -n+1, ..., 2, 1, 0\}$ in the consecutive timeframes, training the one or more neural networks to generate an importance map associated with timeframe $t_i$ by:

9310 generating an input occupancy grid map (OGM) based on the 3D point cloud associated with timeframe $t_i$ 9320 generating a binary OGM by combining the binary map associated with timeframe $t_i$ and the input OGM 9330 generating a set of map feature vectors associated with timeframe $t_i$ indicative of one or more areas of interest using a map feature extractor neural network 9340 generating a set of path feature vectors associated with timeframe $t_i$ using the path feature extractor neural network, wherein the set of map feature vectors and the set of path feature vectors have the same dimensions 9350 concatenating the set of map feature vectors associated with timeframe $t_i$ and the set of path feature vectors associated with timeframe $t_i$ to obtain a set of concatenated feature vectors associated with timeframe $t_i$

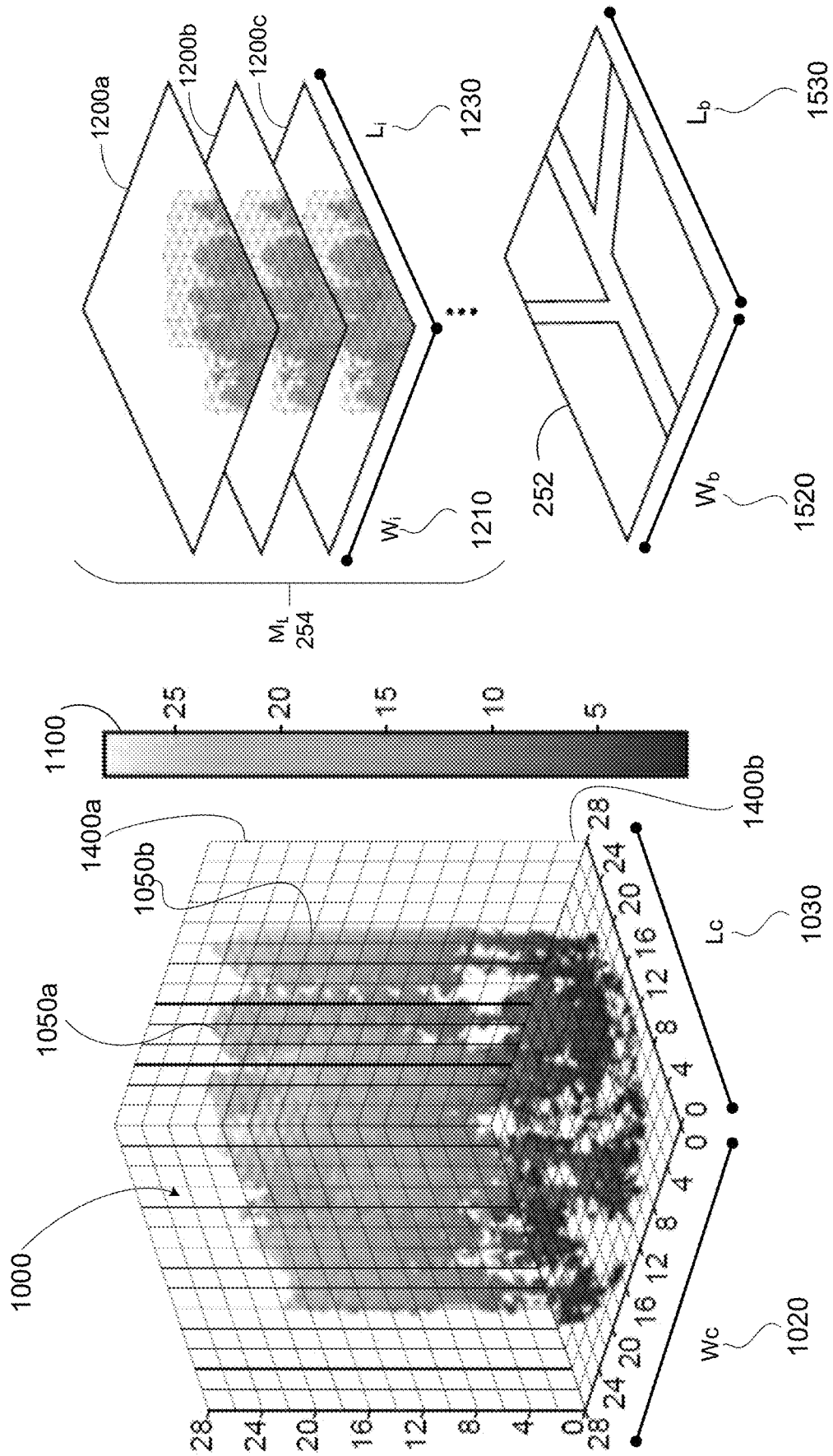

METHOD AND SYSTEM FOR GENERATING AN IMPORTANCE OCCUPANCY GRID MAP

FIELD

The present disclosure relates to generating a map for a vehicle using a point cloud. Specifically, the present disclosure relates to generating an importance occupancy grid map (OGM) using a point cloud generated from one or more sensors on a vehicle.

BACKGROUND

An autonomous vehicle may use different sensors, such as a Light Detection and Ranging (LIDAR) sensor and a camera sensor, to sense its surrounding environment, and may process the raw sensor data received from the different sensors using a perception module to perform object detection, classification, regression, and segmentation in order to detect and identify objects of interest (e.g., pedestrians or other cars).

Information collected from the sensors is provided as sensor data by the various sensors to the planning system of the autonomous vehicle which uses the sensor data for path planning and navigation of the autonomous vehicle. In order to efficiently plan a path and safely navigate an autonomous vehicle in any environment, it is important to have information about the position of any objects (both static and moving objects) in the environment. Occupancy Grid Maps (OGMs) generated from various sensor data are commonly used to represent the environment surrounding an autonomous vehicles.

A single OGM may represent the environment at a specific point in time. The environment in which an autonomous vehicle operates is usually a dynamic, unstructured environment. One way to cope with such an environment is to update the current OGM each time sensor data is received from a sensor of the vehicle and then update the planned path accordingly.

A three-dimensional (3D) point clouds generated from one or more sensors on the vehicle (e.g. from a 3D range sensor such as a LIDAR unit) is often processed to generate one or more OGMs in recognizing various dynamic objects on the road. However, continuously processing 3D point cloud data to accurately detect, track, and segment dynamic objects requires a significant amount of computational resources; existing methods also tend to process the entire point cloud domain for objects of interest, making object detection relatively slow.

There is a need for an improved solution that can efficiently process raw point cloud data to detect dynamic objects on the road for navigation of autonomous vehicles in a dynamic environment using less computational resource than traditionally required.

SUMMARY

In accordance with an aspect of the present disclosure, there is provided a method for generating an importance occupancy grid map (OGM) for a vehicle. The method includes: receiving a 3D point cloud; receiving a binary map, the binary map associated with a Global Positioning System (GPS) location from a GPS unit of the vehicle; receiving, from a path planning module of the vehicle, path command information representative of a planned path for the vehicle and generating, by a map generation module, an importance OGM based on the 3D point cloud, the binary map and the path command information representative of the planned path for the vehicle. This importance OGM can be used to filter object detection region and reduce computation of object detection, segmentation and tracking components. By taking into consideration the planned path of the vehicle, the method can extract, from the 3D point cloud and the binary map, regions that are most relevant to the vehicle's current course. Therefore the method is configured to limit most of the data processing to areas that can potentially conflict with the planned trajectory of the vehicle, and to focus on object detection in those areas only, thereby increasing computational efficiency at runtime.

The simplified binary map may be used to augment the object detection, segmentation or tracking machine learning process and in turn saves computational resources when generating an importance OGM in real time or near real time for object identification at runtime. A binary map may contain less information as compared to a high-definition (HD) map, and only includes critical road data such as geometry of lanes and lane boundaries. It may also include lane groups.

In accordance with the previous aspect, the method the importance OGM includes one or more regions of interest based on the planned path of the vehicle, each of the one or more regions of interest being represented by an object mask indicative of a potential collision for the vehicle on the planned path of the vehicle.

In accordance with any of the previous aspects, the method further includes providing the importance OGM to a path planning module of the vehicle for generating a new planned path for the vehicle based on the one or more regions of interest in the importance OGM.

In accordance with any of the previous aspects, the importance OGM comprises a road mask determined based on the planned path of the vehicle and the road mask has a width correlated to an angular velocity or a speed of the vehicle.

In accordance with any of the previous aspects, the method further includes: generating a input occupancy grid map (OGM) based on the received 3D point cloud; generating a binary OGM by combining the binary map and the input OGM; and generating a set of map feature vectors indicative of one or more areas of interest using a map feature extractor neural network based on the binary OGM.

In accordance with any of the previous aspects, the method further includes: generating a set of path feature vectors indicative of a vehicle trajectory using a path feature extractor neural network, wherein the set of map feature vectors and the set of path feature vectors have the same dimension; and concatenating the set of map feature vectors and the set of path feature vectors to obtain a set of concatenated feature vectors.

In accordance with the previous aspect, the method includes: generating a set of predicted features based on the concatenated feature vectors using a recurrent neural network, the predicted features indicative of the one or more areas of interest and the vehicle trajectory.

In accordance with the previous aspect, the method includes: generating the importance OGM from the predicted features using a decoder neural network.

In accordance with any of the previous aspects, the planned path information representative of the planned path comprises an angular velocity and a speed of the vehicle.

In accordance with at least some of the previous aspects, generating the input OGM is based on at least one of: a height value of a bin or polygon enclosing a group of points in the 3D point cloud, an average height value of one or more columns of points in the 3D point cloud, an intensity value of each of one or more points in the 3D point cloud, a range of values based on one or more height values of one or more points in the 3D point cloud, a point density value of one or more points in the 3D point cloud.

In accordance with another aspect, there is provided a method of training a map generation module to generate information indicative of importance OGM based on the 3D point cloud, the binary map and the path command information indicative of a planned path for the vehicle. The map generation module includes a plurality of neural networks that are trained together using a supervised learning algorithm to learn parameters (e.g. weights) of each of the neural networks. An example neural network is a recurrent neural network such as a long short-term memory (LSTM) network. The neural networks, during training of the map generation module, generate importance road masks for one or more objects in a 3D point cloud, based on ground truth OGMs that have been previously generated based on historical data including previously obtained point clouds, binary maps and path command information. An importance road mask is generated for one or more objects in the 3D point cloud based in part on if the objects are sufficiently close to the vehicle in the planned path of the vehicle. Using this method, a 3D point cloud can be cropped smartly and efficiently to keep the most important objects for further processing using less computational resource and in less time.

In accordance with another aspect, a processing system for generating an importance occupancy grid map (OGM) for a vehicle is provided, the processing system includes: a processing unit; and a memory coupled to the processing unit, the memory storing machine-executable instructions that, when executed by the processing unit, cause the processing system to: receive a 3D point cloud; receive a binary map, the binary map being associated with a set of GPS coordinates from a GPS unit of the vehicle; receive, from a path planning module of the vehicle, information representative of a planned path for the vehicle; and generate, by a map generation module, an importance OGM based on the 3D point cloud, the binary map and the information representative of the planned path for the vehicle.

In accordance with another aspect, there is provided a processor-implemented method for training a map generation module to generate an importance occupancy grid map (OGM) based on a point cloud, a binary map, and path command information. The processor-implemented method includes receiving a set of labelled training data for n consecutive times $\{t_{-n}, t_{-n+1}, t_{-n+2} \ldots t_2, t_1, t_0\}$, the set of labelled training data comprising labelled training data corresponding to each time $t_i$ in the n consecutive times, each labelled training data comprising a 3D point cloud, a binary map, path command information representative of a planned path of a vehicle, and a ground truth importance OGM. The processor-implemented method further includes, for each time $t_i$, where $i=\{-n, -n+1, \ldots, 2, 1, 0\}$ in the n consecutive times, providing labelled training data corresponding to time $t_i$ to the map generation module to train the map generation module by: generating an input occupancy grid map (OGM) based on the 3D point cloud included in the labelled training data corresponding to time $t_i$, generating a binary OGM by combining the binary map included in the labelled training data corresponding to time $t_i$ and the input OGM; generating a set of map feature vectors associated with time $t_i$ indicative of one or more areas of interest using a map feature extractor neural network; generating, based on the path command information representative of a planned path of the vehicle included in the labelled training data corresponding to time $t_i$, a set of path feature vectors associated with time $t_i$ using the path feature extractor neural network, wherein the set of path feature vectors indicate a vehicle trajectory, and wherein the set of map feature vectors and the set of path feature vectors have the same dimensions; concatenating the set of map feature vectors associated with time $t_i$ and the set of path feature vectors associated with time $t_i$ to obtain a set of concatenated feature vectors associated with time $t_i$; generating a set of predicted features associated with time $t_i$ based on the concatenated feature vectors associated with time $t_i$ using a recurrent neural network, the predicted features indicative of the one or more areas of interest and the vehicle trajectory; generating an importance OGM associated with $t_i$ from the predicted features associated with time $t_i$ using a decoder neural network; computing an error signal based on the ground truth OGM included in the labelled training data corresponding to time $t_i$ and the importance map associated with time $t_i$; and backpropagating the error signal to the map feature extractor neural network, the path feature extractor neural network, the recurrent neural network, and the decoder neural network to adjust parameters of the map feature extractor neural network, the path feature extractor neural network, the recurrent neural network, and the decoder neural network.

In accordance with the preceding aspect, the path command information representative of the planned path comprises an angular velocity and a speed of the vehicle.

In accordance with any of the preceding aspects, generating the input OGM is further based on the path command information included in the in the labelled training data corresponding to time $t_i$, the path command information including at least one of: information indicative of a height value of a bin or polygon enclosing a group of points in the 3D point cloud associated with time $t_i$, information indicative of an average height value of one or more columns of points in the 3D point cloud associated with time $t_i$, information indicative of an intensity value of each of one or more points in the 3D point cloud associated with time $t_i$, information indicative of a range of values based on one or more height values of one or more points in the 3D point cloud associated with time $t_i$, information indicative of a point density value of one or more points in the 3D point cloud associated with time $t_i$.

In accordance with yet another aspect, there is provided a processor-implemented method for generating ground truth importance occupancy grid maps (OGMs). The processor implement method includes: receiving a plurality of 3D point clouds, each of the plurality of 3D point clouds being associated with a respective time in a set of consecutive times, and each of the plurality of 3D point clouds comprises one or more objects; processing the plurality of 3D point clouds to obtain a unique object ID and an object type for each of the one or more objects; receiving a plurality of GPS locations of a vehicle, each of the plurality of GPS coordinates being generated at a respective time in the set of consecutive times; receiving a plurality of binary maps, each of the plurality of binary maps being associated with a respective time in the set of consecutive times and based on the GPS coordinate of the vehicle at the respective time; for each respective time in the set of consecutive time, generating an object map based on the 3D point cloud associated with the respective time, wherein the object map comprises a representation for each of the one or more objects; for each of the one or more objects, generating a trajectory map associated with the unique object ID for said object across all the times in the set of consecutive times based on the object map associated with each time in the set of consecutive times, wherein the trajectory map comprises each instance of the object across all the times in the set of consecutive times, wherein each instance of the object is generated based on a GPS location of the object at a respective time in the set of consecutive time; determining a trajectory path for each of the one or more objects based on the trajectory map of the object; generating a list of relevant objects for the vehicle based on the trajectory paths of the one or more objects; for each respective time in the set of consecutive times, generating a trajectory map for the vehicle comprising a trajectory path of the vehicle, the trajectory path of the vehicle being determined based on the binary map associated with the respective time and the GPS locations of the vehicle associated with the respective time, wherein the trajectory path of the vehicle is represented using a road mask; for each respective time in the set of consecutive time, generating a ground truth importance OGM based on the trajectory path of the vehicle associated with the respective time and the trajectory path for each object in the list of relevant objects, wherein the ground truth importance OGM comprises: the road mask representing the trajectory path of the vehicle associated with the respective time, an object mask for each object in the list of relevant objects, and a distance between the vehicle in the trajectory path of the vehicle and each object mask for each object in the list of relevant objects.

In accordance with the preceding aspect, the list of relevant objects comprises at least one object from the one or more objects, wherein the at least one object, across the set of consecutive times, has a minimum Euclidean distance with the vehicle and the minimum Euclidean distance is than a pre-determined threshold.

In accordance with any of the preceding aspects, the road mask used to represent the trajectory path of the vehicle has a width that is determined based on one or more of: a road type of the trajectory path, a velocity of the vehicle, and a type of the vehicle.

In accordance with any of the preceding aspects, the object mask for each object in the list of relevant objects has a shape, size, radius, width or length determined based on a kinematic information of the object.

BRIEF DESCRIPTION OF THE DRAWINGS

Reference will now be made, by way of example, to the accompanying drawings which show example embodiments of the present application, and in which:

FIGS. 9A and 9B is a flowchart illustrating an example method of training the map generation module of FIG. 2 using a supervised learning algorithm to learn weights of a plurality of neural networks of the map generation module of FIG. 2.

FIG. 10A illustrates an example 3D point cloud divided into small blocks for generating one or more 2D input OGMs; and FIG. 10B illustrates an example set of multi-layer input OGMs and an example binary mask.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems for localization of an autonomous vehicle. An autonomous vehicle may be any type of vehicle, such as a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects. Even though the vehicle control system described herein has been described to facilitate semi or fully autonomous driving, it can also be used for vehicles during non-autonomous driving mode.

Figure 1:
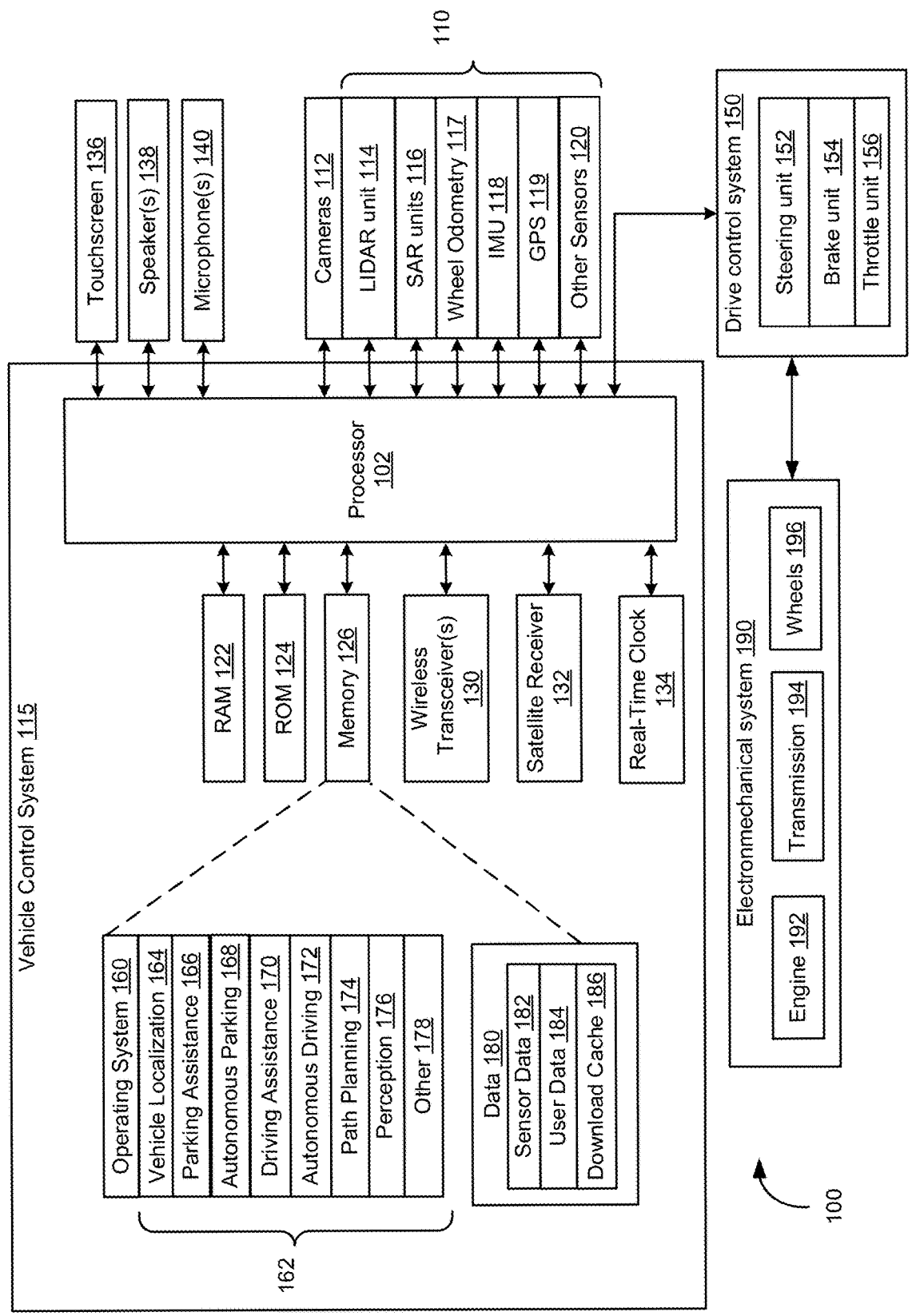
FIG. 1 is a block diagram illustrating some components of an example autonomous vehicle.

FIG. 1 illustrates selected components of an autonomous vehicle 100 in accordance with an example embodiment of the present disclosure. The vehicle 100 may include a vehicle control system 115 that is connected to sensors or a sensor system 110, a drive control system 150 and a mechanical system 190. The vehicle 100 also comprises various structural elements such as a frame, doors, panels, seats, windows, mirrors and the like that are known in the art but that have been omitted from the present disclosure to avoid obscuring the teachings of the present disclosure. The sensors 110 are mounted to structural elements of the vehicle 100 at various locations on the vehicle 100.

The vehicle control system 115 includes a processor 102 that is coupled to a plurality of internal components of the vehicle 100 via a communication bus (not shown). The processor 102 is coupled to a Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network, a satellite receiver 132 for receiving satellite signals from a satellite network, a real-time clock 134. The vehicle control system 115 is also coupled to other components of the vehicle 100, including the sensors 110, a touchscreen 136, speaker(s) 138, microphone(s) 140, the drive control system 150, and the mechanical system 190.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations of a wireless WAN (e.g., cellular network) within its geographic coverage area. The one or more wireless transceiver(s) 130 may send and receive signals over a wireless WAN. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as Ultra Wideband (UWB)), Z-Wave, ZigBee, ANT/ANT+ or infrared (e.g., Infrared Data Association (IrDA) communication).

The real-time clock 134 may comprise a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices of the vehicle 100 (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 100. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information from a path planning system 174 stored in the memory 126 of the vehicle control system 115 and generate control signals to control the steering, braking and throttle of the vehicle 100, respectively to drive a planned path. The drive control system 150 may include additional components to control other aspects of the vehicle 100 including, for example, control of turn signals and brake lights.

The mechanical system 190 receives control signals from the drive control system 150 to operate the mechanical components of the vehicle 100. The mechanical system 190 effects physical operation of the vehicle 100. The mechanical system 190 comprises an engine 192, a transmission 194 and wheels 196. The engine 192 may be a gasoline-powered engine, a battery-powered engine, a hybrid engine, an electric for example. Other components may be included in the mechanical system 190, including, for example, turn signals, brake lights, fans and windows.

A graphical user interface (GUI) may be rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 that is executed by the processor 102. The memory 126 also has stored thereon a number of software modules collectively referred to as autonomous driving system (ADS) 162 in addition to the GUI, where each module of the autonomous driving system 162 is software that includes machine-readable instructions executable by the processor 102. The modules of the autonomous driving system 162 include vehicle localization module 164, parking assistance module 166, autonomous parking module 168, driving assistance module 170 for semi-autonomous driving, path planning module 174, perception module 176, and other modules 178. Other modules 178 include for example mapping module, navigation module, climate control module, media player module, telephone module and messaging module, etc. are also stored in the memory 126. In some embodiments, the perception module 176, which may also be referred to as the perception module, when executed by the processor 102, causes the operations of methods described herein to be performed.

Although shown as a separate modules that may be used by the parking assistance module 166, autonomous parking module 168, driving assistance module 170 for semi-autonomous driving, autonomous driving module 172, path planning module 174, or the perception module 176 may be combined with one or more of the other software modules in other embodiments.

The memory 126 also stores a variety of data 180. The data 180 may comprise sensor data 182 sensed by one or more of the sensors 110, user data 184 comprising user preferences, settings and optionally personal media files (e.g., music, videos, directions, etc.), and a download cache 186 comprising data downloaded via the wireless transceivers 130. For example, the memory 126 may store image data received from the cameras 112, LIDAR data (e.g., three-dimensional data representative of a three-dimensional point cloud d) received from the LIDAR scanning system 114, SAR data received from the SAR units 116, odometry data from wheel odometry unit 117 and/or an inertial measurement unit (IMU) 118, location data from global positioning system (GPS) 119, and data from other sensors 120. The odometry data received from the wheel odometry unit 117 includes rotation data indicative of rotation of the vehicle 100 and translation data indicative of a translation of the vehicle 100. The odometry data received from the IMU 118 includes three-axis angular velocity of the vehicle 100 and three-axis acceleration of the vehicle 100.

In some embodiments, the processor 102 receives sensor data from the LIDAR unit 114 mounted on the vehicle 100 and generates 3D point clouds based on the sensor data received from the LIDAR unit 114. The perception module 176 can in some embodiments be implemented as a software system as part of a software stack of the autonomous driving system 160 ("ADS software stack"). The perception module 176 can receive 2D images and 3D point clouds from the processor 102, and output detected objects in the 2D images or 3D point clouds to other software systems of the ADS software stack, such as the path planning module 174.

The LIDAR unit 114 may capture information in a wide view (e.g., 360° view) about the vehicle 100. The LIDAR unit 114 captures three-dimensional (3D) information about the environment, and generates a set of data points in 3D coordinate system. The 3D data points collectively are known as 3D point cloud.

It is to be appreciated that a 3D point cloud may be generated based on sensed data from any capable 3D range sensor (e.g. the LIDAR unit 114), a RADAR unit, or a stereo camera.

Using the various sensing units 112, 114, 116, 117, 118, 119 the sensor system 110 may collect information about the local external environment of the vehicle 100 (e.g., any immediately surrounding obstacles) as well as information from a wider vicinity (e.g., the LIDAR unit 114 may collect information from an area of up to 100-meter radius or more around the vehicle 100). The sensor system 110 may also collect information about the position and orientation of the vehicle 100 relative to a frame of reference (e.g., using the GPS unit 119). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer and/or inertial measurement unit), which may or may not be part of the sensor system 110, to determine the state of the vehicle 100, such as linear speed, angular speed, acceleration and tire grip of the vehicle 100. The sensor system 110 may repeatedly (e.g., in regular intervals) receive information from its sensing units in real-time. The sensor system 110 may in turn provide sensor data in real-time or near real-time to other components of the vehicle 100.

The sensor system 110 communicates with the perception module 176 via the processor 102 to provide sensor data, including 3D point cloud to the perception module 176, which has been implemented to detect and identify objects in the external environment, for example to detect and identify a pedestrian or another car. The perception module 176 may use any suitable modules (e.g., using machine learning processes) to perform object detection, classification, regression, and segmentation on 3D point cloud to detect and identify objects. The perception module 176 in this example includes modules that generates an importance OGM using one or more neural networks trained using weakly supervised machine learning techniques, as described in detail below.

The modules of the perception module 176 may be implemented using software, which may include any number of independent or interconnected modules. For example, the perception module 176 may be implemented using a dedicated image processor, or may be implemented using one or more general processors of a vehicle controller (not shown) of the vehicle 100. The perception module 176 may repeatedly (e.g., in regular intervals) receive sensor data from the sensor system 110 and perform object detection, classification, regression, and segmentation to detect and identify objects in real-time or near real-time. The output of the perception module 176 may include, for example identification of detected objects, including object class, object bounding boxes, objection segments (e.g., object masks), object location and object boundary, in 2D and/or 3D coordinate system.

Sensor data from the sensor system 110 and the output from the perception module 176 may be provided to the path planning module 174. The path planning module 174 carries out path planning for the vehicle 100. Output from the path planning module 174, which is a path command signal S, may be provided to the drive control system 150. The path command signal S may also be provide to other modules of the vehicle control system 115.

The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

The vehicle control system 115 comprises a satellite receiver 132 that may use signals received by a satellite receiver from a plurality of satellites in a satellite network to determine its position. The satellite network typically comprises a plurality of satellites which are part of at least one Global Navigation Satellite System (GNSS) that provides autonomous geo-spatial positioning with global coverage. For example, the satellite network may be a constellation of GNSS satellites. Example GNSSs include the United States NAVSTAR Global Positioning System (GPS) or the Russian Global Navigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

Recently, computer vision methods in autonomous vehicles tend to use high-definition (HD) maps to augment point cloud data in order to achieve object identification and to aid with trajectory planning, but processing these HD maps is computationally intensive, especially when using such a data-rich map as input to one or more neural networks. Moreover, existing methods that use deep learning to process point clouds and HD maps generally focus on outputting objects and their intentions on the road. In addition, existing deep learning solutions for autonomous driving often fail to take the planned trajectory of the vehicle into consideration, therefore, unnecessary regions of the environment are often examined even when these regions are unlikely to affect the vehicle's trajectory. A proposed solution in this disclosure trains and implements one or more neural networks to avoid unimportant regions and to focus the attention of the algorithms on the parts of the map that have likely engagements with the planned trajectory of the vehicle at a given point in time.

Finally, the highly detailed HD maps used by existing methods are not always available and are often obtained with a significant amount of time and resources. For example, the HD maps include details like stop signs, traffic lights, exit lanes, turn lanes, and so on, which may be fed into the machine learning algorithms as multiple layers of data or multiple channels of input. The data-crunching involved can be voluminous and therefore computationally intensive. A proposed solution in this disclosure uses a simplified, binary map instead of a HD map to augment the machine learning process and in turn saves computational resources when generating an importance occupancy grid map (OGM) in real time or near real time for dynamic object identification at runtime.

Figure 2:
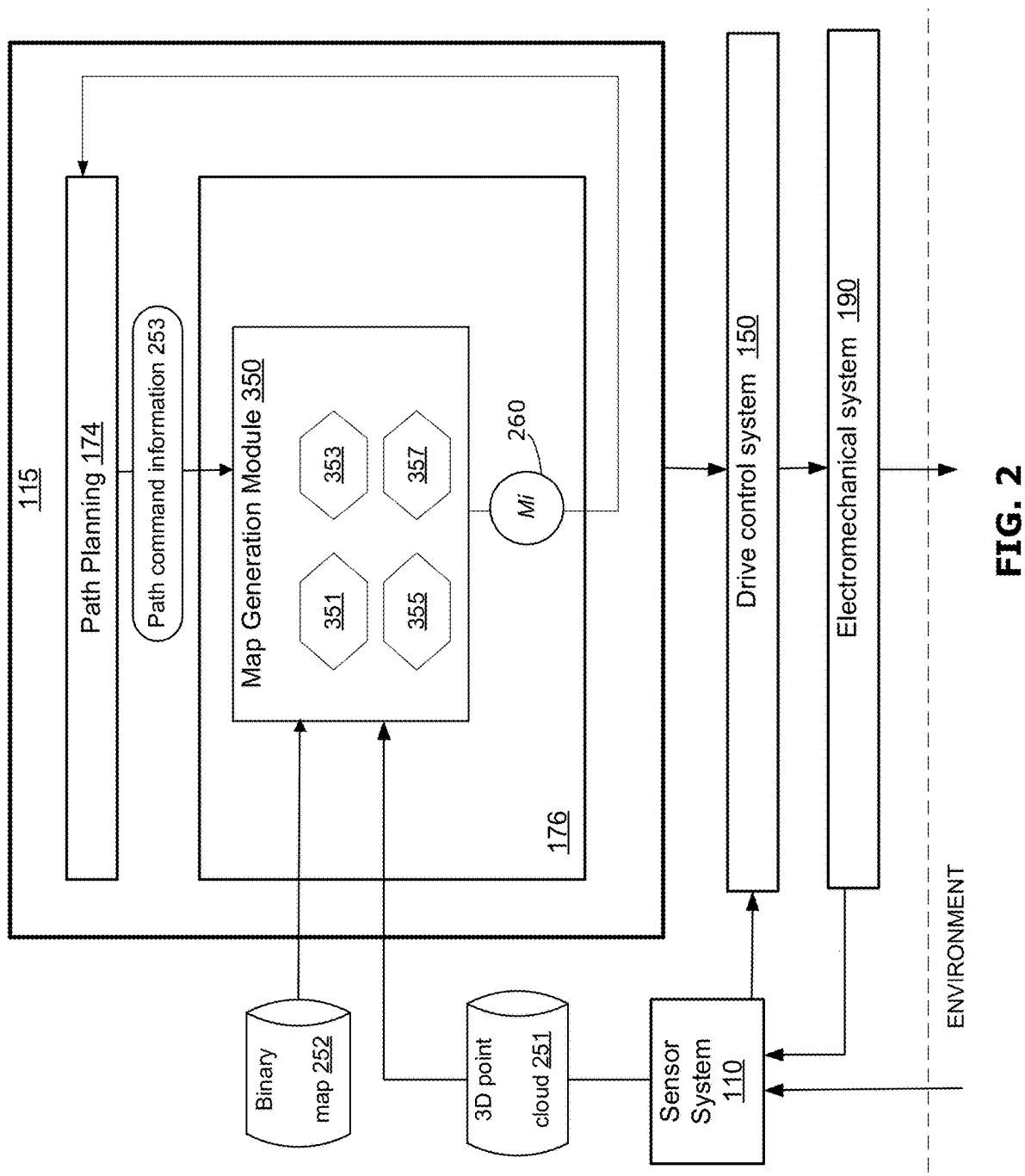
FIG. 2 is a block diagram illustrating an example map generation module within a perception module on a vehicle.

FIG. 2 is a block diagram illustrating an example map generation module 350 within the perception module 176 on a vehicle 100.

The LIDAR unit 114 performs a 3D scan of an environment in which the vehicle 100 is operating by sweeping multiple laser beams across the surrounding environment of the vehicle 100 and generates a 3D point cloud 251 based on the 3D scan. The 3D point cloud 251 may also be referred to as 3D data and is a collection of multiple data points. Each data point in the 3D point cloud can be represented by a set of 3D coordinates (e.g., x, y and z values in meters) of a sensed object in 3D coordinate system. Generally, each data point in a 3D point cloud may be represented as a vector containing values of x, y, and z coordinates, and optionally other values (e.g., additional information such as intensity of reflected light or time of detection).

A 3D point cloud corresponds to a particular time in point, and may include a timestamp throughout the present disclosure. That is, a 3D point cloud may be associated with a timeframe. Multiple 3D point clouds may each be associated with a respective timeframe in a set of consecutive timeframes. The data points in a 3D point cloud may be irregularly spaced, depending on the external environment. In some embodiments, in addition to 3D coordinates, each data point in the 3D point cloud may also contain other information, such as intensity of reflected light or time of detection. In some embodiments, a 3D point cloud may be pre-processed to yield additional point cloud information which may include, without limitation: point cloud information representative of a height value of a bin or polygon enclosing a group of data points in the 3D point cloud, point cloud information representative of an average height value of one or more columns of points in the 3D point cloud, point cloud information representative of an intensity value of each of one or more data points in the 3D point cloud, point cloud information representative of a range of values based on one or more height values of one or more data points in the 3D point cloud, point cloud information representative of a point density value of one or more data points in the 3D point cloud. Each additional point cloud information noted above may form part (e.g. a channel) of an input OGM that is used to generate a final importance OGM, as described below in detail.

A binary map 252 is obtained by the vehicle drive control system 115 in real time or near real time based on a GPS location of the vehicle 100. The vehicle drive control system 115 receives the GPS location of the vehicle which includes a set of GPS coordinates (e.g. latitude and longitude coordinates) from a GPS unit 119 of the vehicle 100. A binary map 252 contains less information as compared to a HD map, and only includes critical road data such as geometry of lanes and lane boundaries. It may also include lane groups. For example, typical HD maps usually contain high density data including: high density map data, intersection information, road boundaries, signals and road markings (e.g., traffic lights, traffic signs), point cloud of static objects (e.g., trees, buildings), metadata (e.g., names, number of lanes, directions). A binary map 252 at the very simplest form may contain just enough data to indicate whether each individual cell (which may be a pixel or a group of pixels) belongs to a road or not. If the individual cell is part of a road, the cell may contain a value of 1, otherwise a value of 0. In some cases, the binary map may contain additional data such as intersections or number of lanes.

As mentioned, a binary map 252 typically contains less information as compared to a HD map, and only includes critical road data such as geometry of lanes and lane boundaries. It may also include lane groups. In some example embodiments, a binary map 252 can be presented simply as a grid map including a plurality of units, where each unit has a corresponding binary value (0 or 1): 0 indicates an area that is not part of a lane; and 1 indicates part of a lane. Each of the units may include one or more pixels. In other embodiments, a binary map 252 may include additional information such as road markings, intersections, and lane groups. In some embodiments, a binary map 252 is obtained by the vehicle control system 115 based on the GPS location of the vehicle 100 by sending a query that includes the GPS location of the vehicle 100 to a database that is stored either in memory of the vehicle 100 or on a remote server in real time or near real time to retrieve the binary map 252. The database, which includes binary maps for different regions of the world, receives the query that includes the GPS location of the vehicle 100, retrieves the binary map that is associated the GPS location, and sends the retrieved binary map to the vehicle control system 115. In some embodiments, a binary map may be derived based on a corresponding HD map based on the GPS location, using the rich spatial and structural information represented by the HD map. In some embodiments, a binary map may be derived, via a preprocessing step, from the corresponding HD map in view of a planned path of the vehicle 100, so only information pertaining to the planned path of the vehicle 100 is required from the HD map. In some embodiments, instead of deriving the binary map 252 from a HD map, it may also be generated from aerial maps based on the GPS location or downloaded from online application programming interfaces (APIs) that can be accessed in real time.

Information representing a planned path for the vehicle 100 may be received by the perception module 176 from path planning module 174 in the vehicle control system 115. The path command information 253 representing a planned path for the vehicle 100 includes one or more of a planned angular velocity ω and a planned speed v of the vehicle 100. The planned angular velocity ω of the vehicle 100 includes information representing a planned turning (if any) such as the direction and the magnitude of the planned turning of vehicle 100. The planned angular velocity ω of the vehicle 100 may be represented by a vector. In some embodiments, the path command information 253 includes a value equivalent to ω/v (angular velocity over speed) of the vehicle 100. The path command information 253 may in some embodiments include additional information such as angle of rotation of the planed path of the vehicle 100. The path command information 253 is associated with a timeframe at which the path command information 253 is generated or retrieved by the perception module 176.

A map generation module 350 receives the 3D point cloud 251, the binary map 252, and the path command information 253 and generates an importance occupancy grid map (OGM) $M_I$ 260 as described in further detail below. The map generation module 350 includes, a map feature extractor neural network (NN) 351, a path feature extractor NN 353, a recurrent neural network 355 and a decoder network 357. The neural networks 351, 353, 355, 357 are pre-trained and optimized using a set of labelled training data, with each labelled training data corresponding to one timeframe in a series of consecutive timeframes. The generated importance OGM $M_I$ 260 includes one or more regions of interest based on the planned path of the vehicle 100, where each of the one or more regions of interest is represented by an object mask indicative of a potential collision for the vehicle 100 based on the planned path of the vehicle 100. The generated importance OGM $M_I$ 260 can be then sent to the path planning module 174 for generating a new planned path for the vehicle 100, where the new planned path minimizes collision risk with the identified regions of interest in the importance OGM $M_I$ 260.

In some embodiments, the new planned path may be sent to the drive control system 150 to control operation of the vehicle 100. The mechanical system 190 receives control signals from the drive control system 150 to operate the mechanical components of the vehicle 100 to cause the vehicle 100 to travel on the new planned path.

Figure 4:
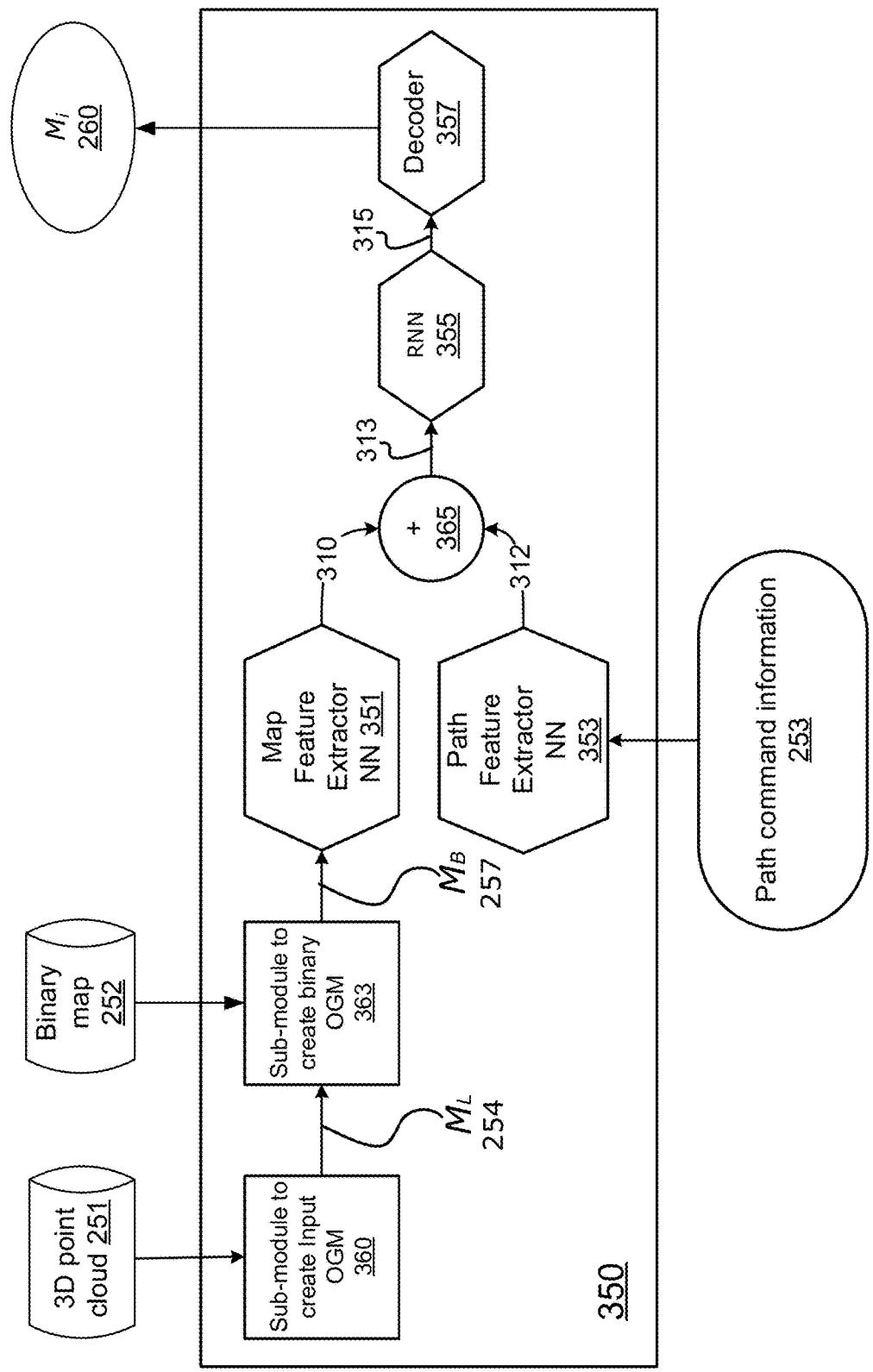
FIG. 4 is a block diagram illustrating operation of the trained map generation module at inference for generating an importance occupancy grid map (OGM)

FIG. 4 is a block diagram illustrating operation of the trained map generation module 350 at inference. The trained map generation module 350 is configured to generate an importance OGM 260 based on a current 3D point cloud 351, a current binary map 252, and current path command information 253 received from the path planning system 174 as described in further detail below. For the purposes of the present disclosure, a current 3D point cloud is the 3D point cloud received from the LIDAR unit 114 when the LIDAR unit 114 performs a scan of the environment surrounding the vehicle 100. A current binary map 252 is the binary map obtained using a query that includes the GPS location of the vehicle 100 obtained at the time the 3D point cloud is received from the LIDAR unit 114. The current path command information 253 is the path command information obtained from the path planning module of the vehicle 100 based on the current GPS location of the vehicle 100 when the 3D point cloud is received from the LIDAR unit 114. As shown in FIG. 4, the sub-module 360 receives the current 3D point cloud 251, and generates an input OGM $M_L$ 254 based on the current 3D point cloud 251. The sub-module 360 pre-processes the current 3D point cloud 251 to generate path planning information, including: information indicative of a height value of a bin or polygon enclosing a group of the collection of data points in the 3D point cloud, information indicative of an average height value of one or more columns of data points in the 3D point cloud, information indicative of an intensity value of each of one or more data points in the 3D point cloud, information indicative of a range of values based on one or more height values of one or more data points in the 3D point cloud, information indicative of a point density value of one or more data points in the 3D point cloud. Each of the above-noted information included in the path planning information 253 is stored in a respective channel of the input OGM $M_L$ 254.

Referring now to FIG. 10A, which illustrates an example 3D point cloud 351 divided into blocks 1050a, 1050b by the sub-module 360 of the map generation module 350. The 3D point cloud 351 is divided into a plurality of individual blocks 1050a, 1050b in order to generate one or more individual input OGMs 1200a, 1200b, 1200c shown in FIG. 1013. Each individual block 1050a, 1050b has a respective intensity value and a respective height value 1100. An individual block 1050a, 1050b may have a voxel shape. A group of individual blocks with the same height value 1100 may be grouped to form a layer of blocks 1400a, 1400b. Each layer of blocks 1400a, 1400b therefore has a corresponding layer height value that is generated based on the height value of each individual block within the layer 1400a, 1400b (e.g. average of the height values 100 of all the blocks within the layer 1400a, 1400b). Each layer of blocks 1400a, 1400b has a width $W_c$ 1020 and a length $L_c$ 1030. A layer of blocks 1400a, 1400b may also be referred to as a layer of the 3D point cloud 251, and the width $W_c$ 1020 or length $L_c$ 1030 of each layer may be referred to as the width $W_c$ 1020 or length $L_c$ 1030 of the 3D point cloud 251.

FIG. 10B shows an example set of multi-layer OGM including individual input OGMs 1200a, 1200b, 1200c, which may collectively form an input OGM $M_L$ 254 generated by the sub-module 360 shown in FIG. 4. Each individual OGM 1200a, 1200b, 1200c has a width $W_i$ 1210 and a length $L_i$ 1230. The width $W_i$ 1210 has the same value as the $W_c$ 1020 of the 3D point cloud 351, and the length $L_i$ 1230 has the value as the length $L_c$ 1030 of the 3D point cloud 351. A single layer 1400a, 1400b of 3D point cloud 351 may be used to generate a single 2D input OGM 1200a, 1200b, 1200c. Therefore, a 3D point cloud 351 with a plurality of layers 1400a, 1400b may be used to generate a plurality of 2D input OGMs 1200a, 1200b, 1200c, each of which may be used to form a respective part of the input OGM $M_L$ 254. Each individual cell of the 2D input OGM 1200a, 1200b, 1200c is generated based on a respective individual block in the corresponding layer 1400a, 1400b of the 3D point cloud 351, and the individual cell may have a cell width and a cell length, where the cell width is the same as the width of the corresponding block in the corresponding layer, and the cell length is the same as the length of the corresponding block in the corresponding layer.

Referring again to FIG. 4, a second sub-module 363 receives the input OGM $M_L$ 254 and the binary map 252, and combines the binary map 252 with the input OGM $M_L$ 254 to generate a binary OGM $M_B$ 257 that is provided to the map feature extractor NN 351. In some embodiments, the second sub-module 363 generates the binary OGM $M_B$ 257 by concatenating the binary map 252 to the input OGM $M_L$ 254 as an additional layer or an additional channel. As shown in FIG. 10B, a binary mask 252 has a width $W_b$ 1520 and a length $L_b$ 1530, where the width $W_b$ 1520 has the same value as the width $W_i$ 1210 of a 2D individual input OGMs 1200a, 1200b, 1200c, and the length $L_b$ 1530 has the value as the length $L_i$ 1230 of a 2D individual input OGMs 1200a, 1200b, 1200c.

The map feature extractor NN 351 includes learned parameters (e.g., weights). The parameters of the map feature extractor NN 351 are learned during training of map generation module 350 using a supervised machine learning algorithm as described in further detailed below. The map feature extractor NN 351 which includes learned parameters is referred to hereinafter as a trained map feature extractor NN 351. The trained map feature extractor NN 351 receives the binary OGM $M_B$ 257 as input, generates a set of map feature vectors 310 indicative of one or more areas of interest in the binary OGM $M_B$ 257, and outputs the set of map feature vectors 310. The one or more areas of interest may include areas where potential coalitions may occur between the vehicle 100 and other objects on the road.

The path feature extractor NN 353 includes learned parameters (e.g., weights). The parameters of the path feature extractor NN 353 are learned during training of map generation module 350 using a supervised machine learning algorithm as described in further detailed below. The path feature extractor NN 353 that includes learned parameters is referred to hereinafter as a trained path feature extractor NN 353. The trained path feature extractor NN 353 receives the path command information 253 including at least an angular velocity of the vehicle 100, generates a set of path feature vectors 312 indicative of a vehicle trajectory based on the path command information 253, and outputs a set of path feature vectors 312 indicative of a vehicle trajectory. In some embodiments, the path command information 253 includes a value equivalent to ω/v (angular velocity over speed) of the vehicle 100. The set of map feature vectors 310 and the set of path feature vectors 312 have the same dimensions. The angular velocity indicates a direction of the vehicle's intended path and if a turning action is planned for the vehicle 100, the magnitude or degree of said turning action.

A concatenation sub-module 365 then concatenates the set of map feature vectors 310 and the set of path feature vectors 312 to obtain a set of concatenated feature vectors 313, which are sent as input to a recurrent neural network (RNN) 355. The RRN 355 includes learned parameters (e.g., weights). The parameters of the RNN 355 are learned during training of map generation module 350 using a supervised machine learning algorithm as described in further detailed below. The RNN 355 that includes learned parameters is referred to hereinafter as a trained RNN 355. The trained RNN 355 receives the concatenated feature vectors 313, and predicts features 315 based on the concatenated feature vectors 313, and outputs the predicted features 315. The predicted features 315 are a set of vectors, which include information representing one or more areas of interest from the set of map feature vectors 310 and the vehicle trajectory from the set of path feature vectors 312. The trained RRN 355 may be Long-Short Term Memory (LSTM) neural network or a Gated Recurrent Unit (GRU) neural network.

The decoder NN 357 also includes learned parameters. The parameters of the decoder NN 357 are learned during training of map generation module 350 using a supervised machine learning algorithm as described in further detailed below. The decoder NN 357 that includes learned parameters is referred to hereinafter as a trained decoder network 357. The trained decoder NN 357 receives the predicted features 315, converts the predicted features 315 into an importance OGM $M_i$ 260 and outputs the OGM $M_i$ 260. The OGM $M_i$ 260 can be used to filter object detection space and to reduce computation of object detection, segmentation and tracking modules (not shown) of the perception system 176 of the ADS 162.

Figure 7:
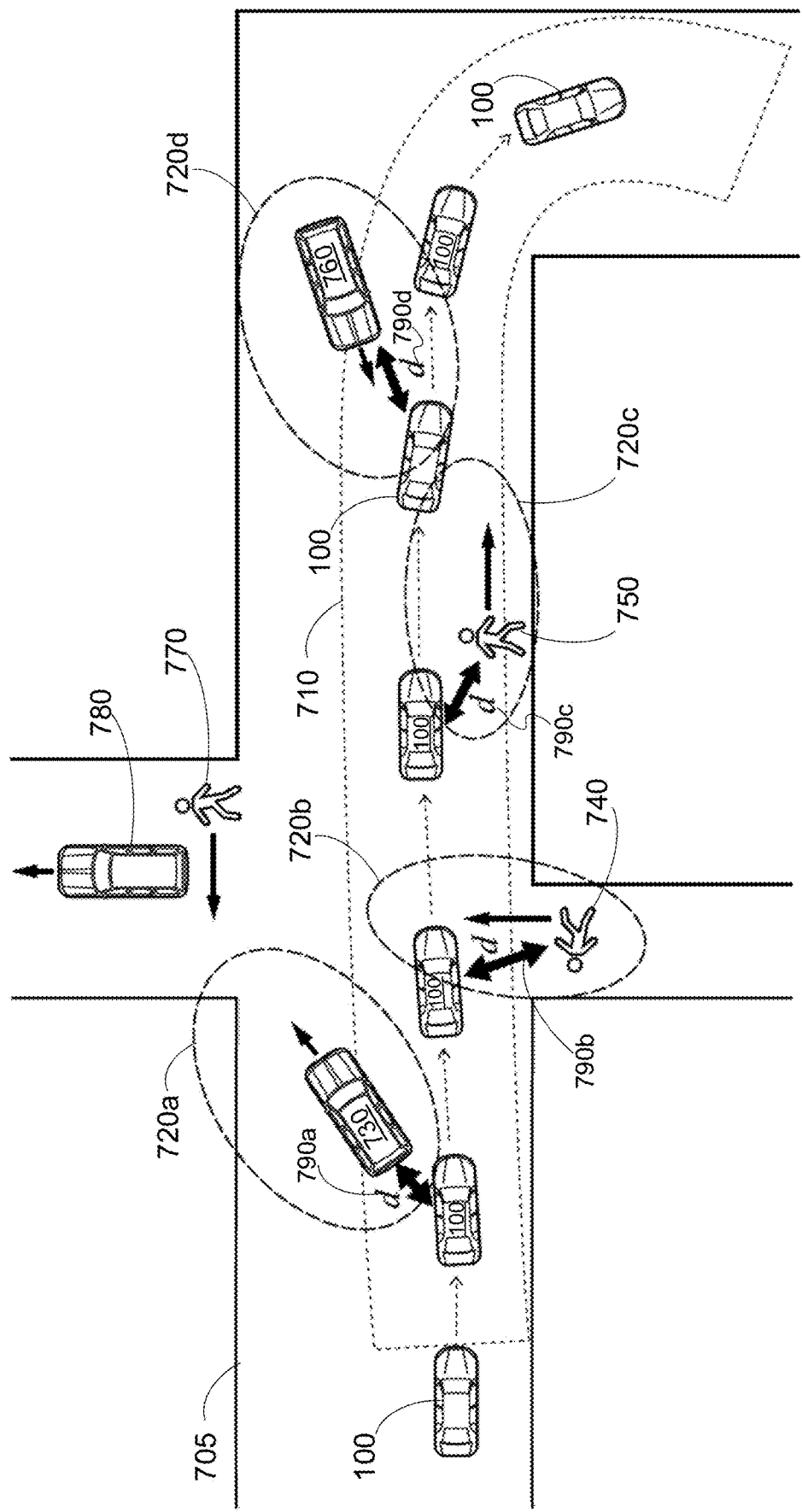
FIG. 7 is a diagram that illustrates an example ground truth importance OGM generated using the series of object maps and the trajectory maps.

The importance OGM $M_i$ 260 (hereinafter "$M_i$ 260") in FIG. 7 shows the vehicle 100 along a trajectory path that is represented by a road mask 710, road boundaries 705, various dynamic objects including a first vehicle 730, a first pedestrian 740, a second pedestrian 750, a second vehicle 760, a third pedestrian 770, and a third vehicle 780. $M_i$ 260 includes one or more regions of interest based on the planned path of the ego-vehicle 100, where each of the one or more regions of interest is represented by a respective object mask 720a, 720b, 720c, 720d. The object mask is used to indicate a potential collision for the vehicle 100 based on the planned path of the vehicle 100. In some embodiments, a region of interest is placed around a dynamic object that has a minimum Euclidean distance with the vehicle 100 at any given point in time (i.e., at any timeframe) along its traveling path, such as the first vehicle 730 having a minimum Euclidean distance 790a, the first pedestrian 740 having a minimum Euclidean distance 790b, the second pedestrian 750 having a minimum Euclidean distance 790c, and the second vehicle 760 having a minimum Euclidean distance 790d. A minimum Euclidean distance generally means the shortest straight-line distance between two points or two lines. The minimum Euclidean distance generally needs to be below a certain distance threshold before a dynamic object is taken by the neural networks to be sufficiently important (i.e., close enough to the traveling path of the ego-vehicle to impact its planned path). A value for the distance threshold itself has been learned and set by the neural networks during its training process, and may be dependent on a number of factors including: an angular and/or linear velocity of the dynamic object, an angular and/or linear velocity of the ego-vehicle, the planned path of the ego-vehicle, a type of the dynamic object, a vehicle type of the ego-vehicle, a neighborhood area and any other suitable factors. The distance threshold may also be manually set by an administrator of the ADS 162 if appropriate.

Each region of interest is represented by an object mask, such as object mask 720a for the first vehicle 730, object mask 720b for the first pedestrian 740, object mask 720c for the second pedestrian 750, and object mask 720d for the second vehicle 760. An object mask 720a, 720b, 720c, 720d may have a pre-determined 2D shape, such as voxel, oval, square, circle, rectangular, octagon, hexagon, or triangle. In some embodiment, each object may have a shape that is determined based on a type of the dynamic object therein. For example, a pedestrian object may have an object mask that is oval in shape; and a car object may have an object mask that is rectangular in shape. In some embodiments, a size of the road mask, such as a width, may be correlated to or determined by one or more kinematic information regarding one or both of the dynamic object within the road mask and the vehicle 100. For example, the diameter or width of an object mask may be determined based on an angular velocity or a speed of the vehicle 100, and/or a linear velocity of the dynamic object associated with the object mask.

In contrast, the third pedestrian 770 and the third vehicle 780 are sufficiently far enough from the vehicle 100 along its traveling path that they are not deemed "important" or "relevant" by the neural networks, and therefore are not associated with a region of interest or an object mask. In other words, the pedestrian 770 and the vehicle 780 each has, in view of the ego-vehicle 100 on its path as represented by the road mask 710, a minimum Euclidean distance above the above-mentioned distance threshold. In some embodiments, any dynamic object that does not have an object mask may be left out of the importance OGM $M_i$ 260, as they are less likely to impact the planned path of the vehicle 100.

Figure 3:
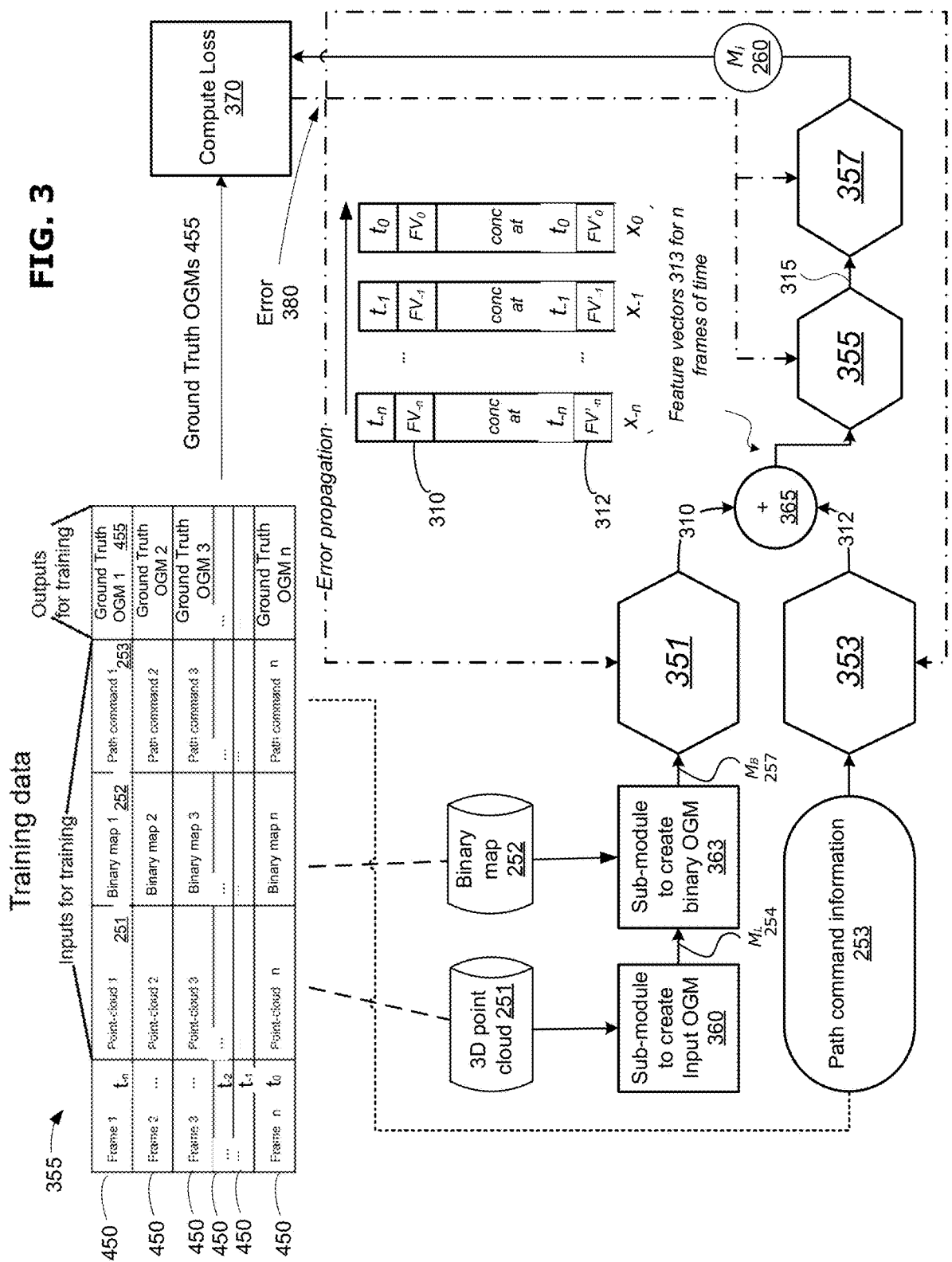
FIG. 3 is a block diagram illustrating training of the map generation module of FIG. 2 using a supervised learning algorithm to learn weights of a plurality of neural networks of the map generation module of FIG. 2.

FIG. 3 is a block diagram illustrating the training of the map generation module 350 using a supervised learning algorithm to learn the parameters (e.g. weights) of the map feature extractor NN 351, the path feature extractor NN 353, the RNN 355, and the decoder NN 357. The map generation module 350 is trained using a set of labelled training data 355 (hereinafter referred to as the labelled training dataset 355). The labelled training dataset 355 includes labelled training data 450 for n consecutive times and the with $t_{-n}$ being the oldest time and to being the most recent time. Each labelled training data 450 in the labeled training dataset 355 has a time stamp $\{t_{-n}, t_{-n+1}, t_{-n+2} \ldots t_2, t_1, t_0\}$ corresponding to a given time $t_i$. The labelled training data 450 having a given time stamp $t_i$ includes a 3D point cloud 251, a binary map 252, path command information 253, and a ground truth importance OGM 455 (otherwise referred to as the ground truth OGM) corresponding to the given time $t_i$. The 3D point cloud 251 is the point cloud 251 observed at a given time $t_i$, the binary map 252 is a binary map obtained based on GPS location of the vehicle 100 for the given time $t_i$, the path command information 253 includes information representative of a planned path for the vehicle 100 at the given time $t_i$. The ground truth OGM 455 for a given time $t_i$ is generated using the 3D point cloud, the binary map, and the path command information from n previous times in the n consecutive times $\{t_{-n}, t_{-n+1}, t_{-n+2} \ldots t_2, t_1, t_0\}$ as described in further detail below. After the ground truth OGM 455 is generated for a given time $t_i$, labelled training data 450 for the given time $t_i$ is generated by associating the generated ground truth OGM 455 for given time $t_i$ with the point cloud 251, the binary map 252, and the path command information 253 for the given time $t_i$. The labelled training data 450 is then added to the labelled training dataset 355. After the ground truth OGM 455 is generated for each time $t_i$ in the n consecutive times, $\{t_{-n}, t_{-n+1}, t_{-n+2} \ldots t_2, t_1, t_0\}$, the labelled training dataset 355 for the n consecutive times, $\{t_{-n}, t_{-n+1}, t_{-n+2} \ldots t_2, t_1, t_0\}$ is stored in memory for use in training the map generation module 350 as described in further detail below.

Referring again to FIG. 3, the training of the map generation module 350 using the labelled training dataset 355 will now be described. For each time where i= $\{-n, -n+1, \ldots, 2, 1, 0\}$, the first sub-module 360 is configured to generate an input OGM $M_L$ 254 based on the 3D point cloud 251. The first sub-module 360 pre-process the 3D point cloud 251 to determine: a height value of a bin or polygon enclosing a group of the collection of data points in the 3D point cloud 251, an average height value of one or more columns of data points in the 3D point cloud 251, an intensity value of each of one or more data points in the 3D point cloud 251, a range of values based on one or more height values of one or more data points in the 3D point cloud 251, or a point density value of one or more data points in the 3D point cloud 251. Each of the above may be stored in a respective channel of the input OGM $M_L$ 254.

The second sub-module 363 receives the OGM $M_L$ 254 provided by the first sub-module 360 and the binary map 252, and combines the binary map 252 with the input OGM $M_L$ 254 to generate a binary OGM $M_B$ 257. The binary OGM $M_B$ 257 is provided to the map feature extractor NN 351. In some embodiments, the second sub-module 363 generates the binary OGM $M_B$ 257 by appending the binary map 252 to the input OGM $M_L$ 254 as an additional channel.

The map feature extractor NN 351 receives the binary OGM $M_B$ 257 as input, generates a set of map feature vectors $FV_i$, where i=$\{-n, -n+1, -n+2 \ldots 2, 1, 0\}$ based on the binary OGM $M_B$ 257, and outputs the set f map feature vectors $FV_i$, where each vector $FV_i$ 310 indicates one or more areas of interest based on the 3D point cloud 251. Each vector $FV_i$ 310 is generated for each time $t_i$ in the consecutive time $\{t_{-n}, t_{-n+1}, t_{-n+2} \ldots t_2, t_1, t_0\}$. The one or more areas of interest may include areas where potential coalitions may occur between the vehicle 100 and other objects on the road.

The path feature extractor NN 353 receives the path command information 253 including at least an angular velocity of the vehicle, generates a set of path feature vectors $FV'_i$, where i=$\{-n, -n+1, -n+2 \ldots 2, 1, 0\}$ based on the path command information 253, and outputs the set of path feature vectors $FV'_i$, where each vector $FV'_i$ 312 indicates a vehicle trajectory. Each vector $FV'_i$ 312 is generated for each time $t_i$ in the consecutive time $\{t_{-n}, t_{-n+1}, t_{-n+2} \ldots t_2, t_1, t_0\}$. The set of map feature vectors $FV_i$ 310 and the set of path feature vectors $FV'_i$ 312 have the same dimensions. The angular velocity indicates a direction of the vehicle's 100 intended path and if a turning action is planned for the vehicle, the magnitude or degree of said turning action. In some embodiments, the path command information 253 is represented by a value equivalent to ωv (angular velocity over speed) of the vehicle 100.

The concatenation sub-module 365 concatenates the set of map feature vectors $FV_i$, 310 and the set of path feature vectors $FV'_i$ 312 at timeframe $t_i$ to obtain a set of concatenated feature vectors 313, which are provided the recurrent neural network (RNN) 355. The RNN 355 receives the concatenated feature vectors 313, and predicts features 315 at time $t_i$ based on the concatenated feature vectors 313, and outputs the predicted feature 315. The predicted features 315 are a set of vectors including information representing one or more areas of interest from the set of map feature vectors $FV_i$, 310 and the vehicle trajectory from the set of path feature vectors $FV'_i$ 312. As noted above, the RNN 355 may be a Long-Short Term Memory (LSTM) neural network or a Gated Recurrent Unit (GRU) neural network.

The decoder neural network 357 receives the predicted features 315, converts the predicted features 315 into an importance OGM $M_i$ 260 at timeframe and outputs the importance OGM $M_i$ 260. The importance OGM $M_i$ 260 is then compared to the ground truth OGM 455in the labeled training data 450 corresponding that has time stamp $t_i$, by a loss-computing sub-module 370. An error 380 is calculated by the loss-computing sub-module 370 based on the importance OGM $M_i$ 260 and the ground truth OGM $M_i$ 455, and the error is back propagated to each of the neural networks 351, 353, 355, 357 to update the weights of the networks.

In some embodiments, the training of the map generation module 350 stops when the labelled training data 455 corresponding to each time $\{t_{-n}, t_{-n+1}, t_{-n+2} \ldots t_2, t_1, t_0\}$ have been processed. In some embodiments, the training of the map generation module 350 stops when the error 380 has reached a value that is less than a threshold value, which means the generated importance OGM $M_i$ 260 is sufficiently close to the ground truth importance OGM 455 included in the labelled training data 455).

After training the map generation module 350 using the labelled training dataset 455, each of neural networks 351, 353, 355, 357 has learned parameters (i.e., weights). The map generation module 350 in which each of neural networks 351, 353, 355, 357 has learned parameters (i.e., weights) is referred to herein as the trained map generation module 350. The trained map generation module 350 may also be referred to as a machine learned map generation module 350. The training of the map generation module 350, which is also described below in association with FIGS. 9A and 9B, may be performed off-site (i.e., not on the vehicle 100) by a computing system (not shown) and after training, the map generation module 350 which includes the trained NNs 351, 353, 355, and 357 (i.e., the NNs 351, 353, 355, 357 that each include the learned parameters) may be deployed to the vehicle 100 (i.e., stored in memory 126 of the vehicle control system 115) and for operation during inference as described above with respect to FIG. 4. The training of the map generation module 350 may be repeated using multiple sets of labelled training data 355 (e.g., labelled training datasets 355).

In some embodiments, the map generation module 350 may be pre-trained trained to learn the parameters of the NNs 351, 353, 355, 357 using a labelled training data set that includes labelled training data 450 before being trained using the labelled training dataset 355 that includes generated ground truth OGMs 455. The map generation module 350 may be trained using a labelled training dataset 355 generated from data obtained from existing databases which store various information regarding historical travel records of one or more vehicles. For example, a sequentially labelled dataset of dynamic objects and associated 3D point cloud may be obtained from existing databases such as KITTI™ dataset of object tracklet boxes from the KITTI Vision Benchmark Suite and processed to generate labelled training data 450 to be included in the labelled training dataset 355.

Figure 5:
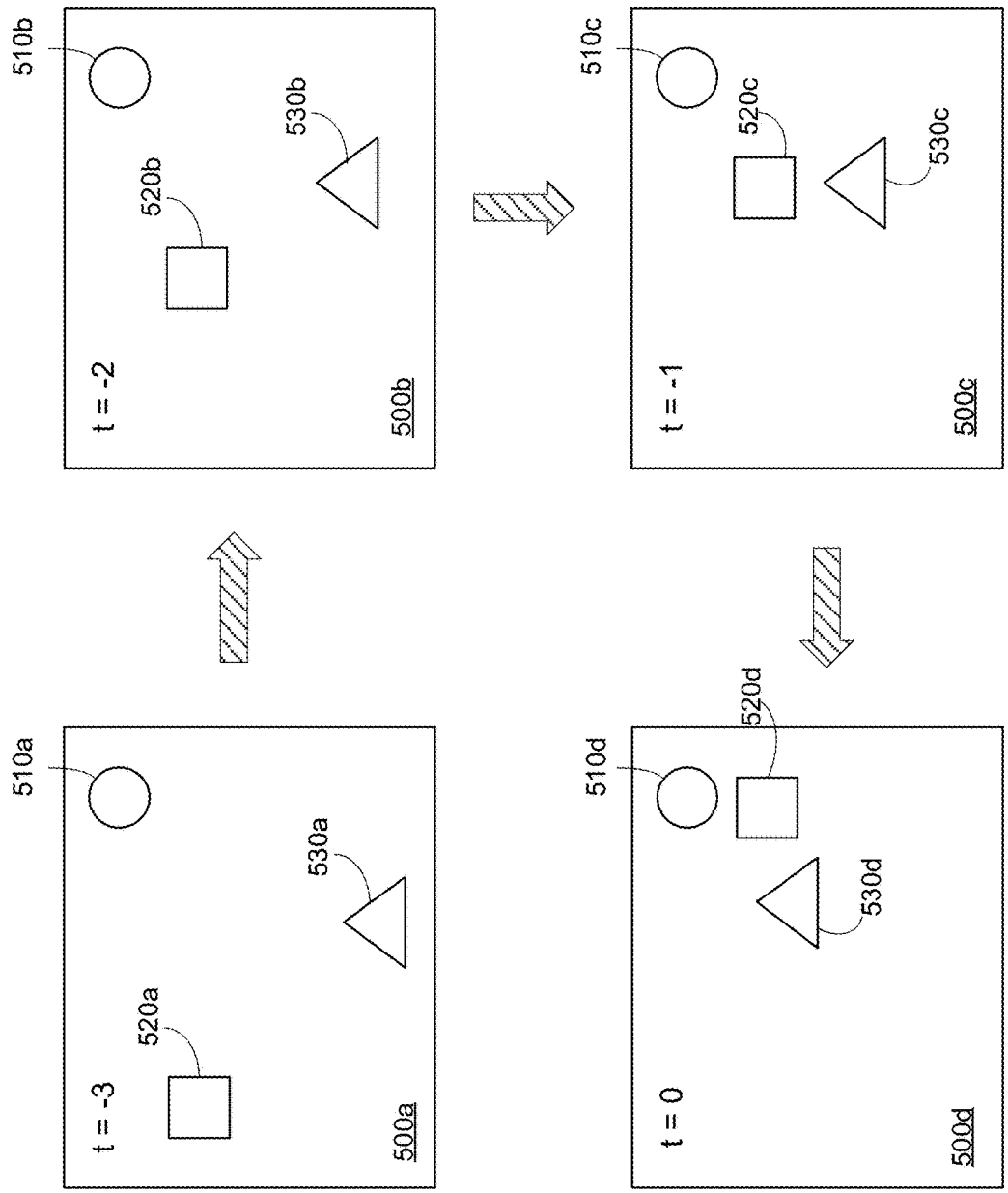
FIG. 5 shows a series of example object maps generated from a series of previously observed 3D point clouds.
Figure 6:
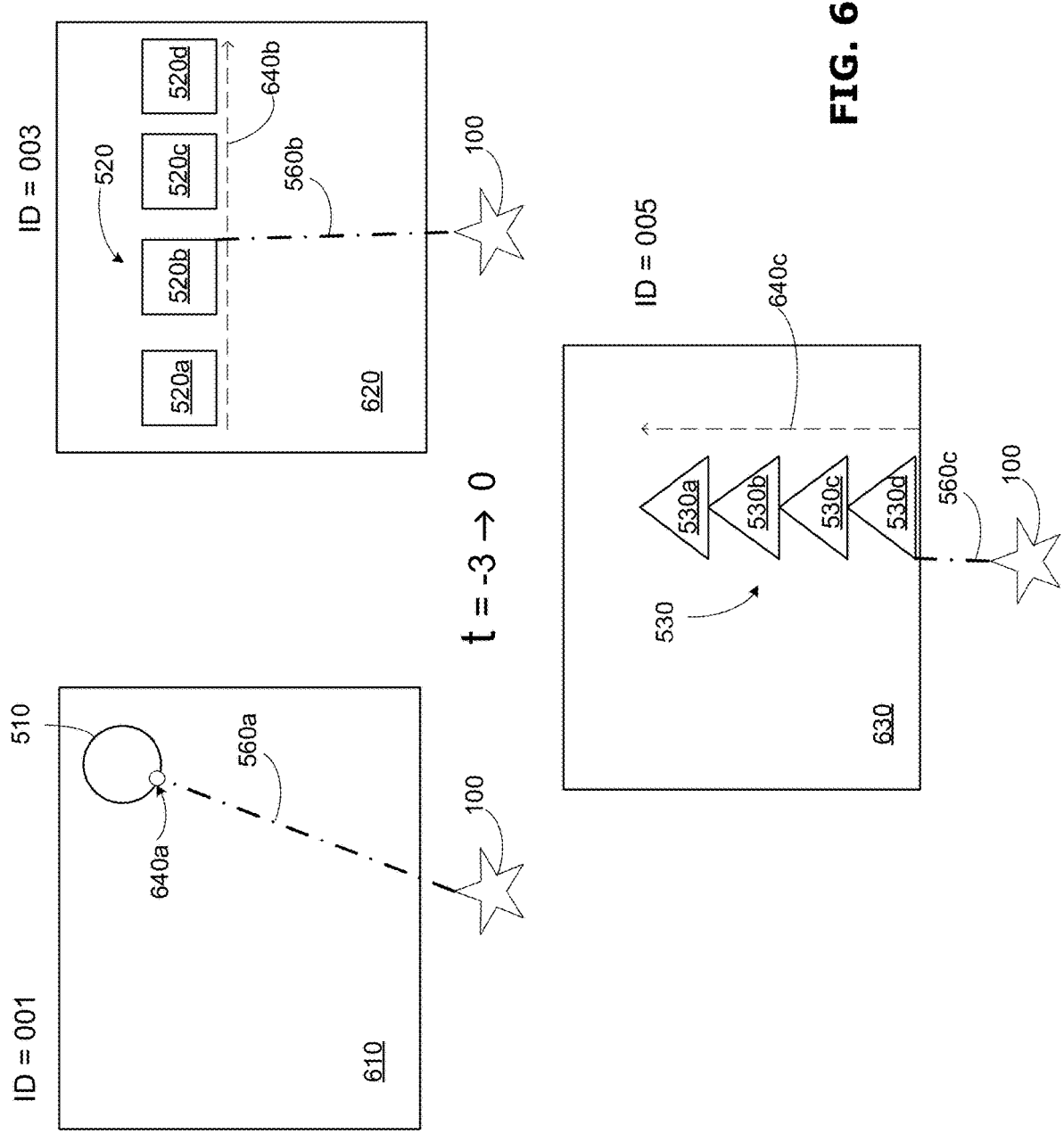
FIG. 6 shows a plurality of example trajectory maps generated based on the series of object maps in FIG. 5.

Referring now to FIG. 5 to FIG. 7, a method of generating ground truth OGMs 455 and labelled training dataset 455 is shown. The method shown in FIG. 5 to FIG. 7 is performed off line by a processing system (not shown). In FIG. 5, a series of example object maps 500a, 500b, 500c, 500d based on 3D point cloud 251 captured in consecutive times $\{t_{-n}, t_{-n+1}, t_{-n+2} \ldots t_2, t_1, t_0\}$ is shown. As mentioned above, a set of labelled training data 355 is used to train the map generation module 350 of the perception system 176. The labelled training data 450 at any given time $t_i$ includes a ground truth OGM 455 for the given time $t_i$ that is generated according to the method described below. The labelled training data set 355 that include labelled training data 450 corresponding to consecutive times $\{t_{-n}, t_{-n+1}, t_{-n+2} \ldots t_2, t_1, t_0\}$ can then be used to train the NNs 351, 353, 355, 357 of the map generation module 350 to optimize the parameters (e.g., weights) of each of the NNs 351, 353, 355, 357.

In order to generate a ground truth OGM 455 for a given time $t_i$ 457 based on the point cloud 251, the binary map 252, and path command information 253 for given time $t_i$, an importance criteria needs to be defined first. The importance criteria is used to determine if an object, whether dynamic or static, should be included in the ground truth OGM 455. The ground truth OGM 455 serves as the label for the labelled training data 450 corresponding to the given time $t_i$. For example, an importance criteria decides if and when an object trajectory is important in relation to a traveling path of an ego-vehicle. In some embodiments, a minimum Euclidean distance may be used to determine potential collisions between the ego-vehicle and an object. The minimum Euclidean distance generally needs to be below a certain distance threshold before an object is determined to be sufficiently important (i.e., close enough to the traveling path of the ego-vehicle to impact its planned path). A value for the distance threshold may be dependent on a number of factors including: an angular velocity and/or linear velocity of the object, an angular velocity ω and/or linear velocity v of the ego-vehicle, the planned path of the ego-vehicle, a type of the object, a vehicle type of the ego-vehicle, a neighborhood area and any other suitable factors. The distance threshold may be manually set for each object type, and optionally further adjusted for each vehicle type of the ego-vehicle. For example, if an object type is a pedestrian with an average walking speed, the distance threshold can be set to 5 meters. For another example, if an object type is a SUV traveling at 50 KM/h on a path that is parallel to the ego-vehicle's traveling path, the distance threshold may be sent to 20 meters.

The processing system (not shown) generates the ground truth OGM 455 for a time $t_i$ based on the 3D point cloud 251, the binary map 252 and the path command information 253 included in the labelled training data 450 corresponding to the time $t_i$. The 3D point cloud 251 may include one or more objects, each having a unique object ID and an object type. The 3D point cloud 251 is processed to determine the GPS location of each object at each timeframe, for each object ID. The objects may be static or dynamic. The binary map 252 may indicate, with a binary value of 1 or 0, if a pixel or grid on the map 252 belongs to a road ("1") or not ("0"). The binary map 252 is associated with the recorded GPS location of the ego-vehicle at the given time $t_i$. The binary map 252 may be retrieved from an existing database that stores binary maps using a query that includes a GPS location of the ego vehicle at the given time $t_i$.

Next, the processing system (not shown) generates, for each respective time $t_i$ in the set of n consecutive times $\{t_{-n}, t_{-n+1}, t_{-n+2} \ldots t_2, t_1, t_0\}$, an object map 500a, 500b, 500c, 500d based on the 3D point cloud 251 associated with the respective time $t_i$. As shown in FIG. 5, an object map 500a, 500b, 500c, 500d at a given time $t_i$ includes a representation for each object at $t_i$ based on a GPS location of the respective object at the given time $t_i$. In FIG. 5, for ease of illustration and distinction between different object types, a circle 510a, 510b, 510c, 510d is used to represent a pedestrian on each object map 500a, 500b, 500c, 500d; a square 520a, 520b, 520c, 520d is used to represent a sedan on each object map 500a, 500b, 500c, 500d; and a triangle 530a, 530b, 530c, 530d is used to represent a SUV on each object map 500a, 500b, 500c, 500d. Other shapes may be used to represent the objects. At time t=−3, object map 500a shows a pedestrian 510a, a sedan 520a and a SUV 530a at various locations. At time t=−2, object map 500b shows that the pedestrian 510b remained in the same spot compared to object map 500a, the sedan 520b has travelled towards the east (right), and the SUV 530b has travelled towards the north (up). At time t=−1, object map 500c shows that the pedestrian 510c still has not yet moved, the sedan 520c has travelled further east and the SUV 530c has travelled further north. At time t=0, object map 500d shows that the pedestrian 510d remains still, the sedan 520d has travelled further east still and the SUV 530d has travelled further north still.

Referring now to FIG. 6, for each object, the processing system (not shown) can then generate a trajectory map 610, 620, 630 for each object 510, 520, 530 associated with the unique object ID across all the time $\{t_3, t_2, t_1, t_0\}$. Each trajectory map 610, 620, 630 displays a trajectory path 640a, 640b, 640c of a single object 510, 520, 530 in question based on the specific GPS location of the single object on each of the object maps 500a, 500b, 500c, 500d across the consecutive times $\{t_3, t_2, t_1, t_0\}$. Each trajectory map 610, 620, 630 includes an instance of the respective object 510, 520, 530 based on its GPS location at each timeframe $t_i$ from $t_3$ to $t_0$. For example, trajectory map 610 includes a pedestrian object 510 (object ID 001). The pedestrian object 510 appears to be stationary across all timeframes from $t_3$ to $t_0$. The trajectory path 640a may therefore be a fixed point on the object 510 on the trajectory map 610. Trajectory map 620 includes, on a trajectory path 640*b*, four instances 520*a*, 520*b*, 520*c*, 520*d* of the sedan object 520 (object ID 003), which appears to have travelled eastbound from $t_3$ to $t_0$. Trajectory map 630 includes, on a trajectory path 640*c*, four instances 530*a*, 530*b*, 530*c*, 530*d* of SUV object 530 (object ID 005), which appears to have travelled northbound from $t_3$ to $t_0$.

The processing system (not shown) then determines the traveling path of the ego-vehicle based on a collection of recorded GPS locations of the ego-vehicle at each time $\{t_3, t_2, t_1, t_0\}$. The traveling path may be further processed using one or more binary maps 252 for the same times. For example, at any given time $t_i$, if and when a binary map 252 is available, the traveling path of the ego-vehicle can be augmented using the road boundary or lane group information from the corresponding binary map 252 for the given time $t_i$. The traveling path of the ego-vehicle and the binary map 252 can be processed to generate a road mask 710 as shown in FIG. 7, the road mask 710 generally representing a traveling path of the ego-vehicle within road boundaries.

Based on the trajectory path 640*a*, 640*b*, 640*c* in each trajectory map 610, 620, 630, the processing system (not shown) determines a list of important or relevant objects in view of the traveling path of the ego-vehicle. An object can be determined to be relevant based on a set of rules, which may be pre-determined. For example, an object 520 can be said to be relevant if, at any point along its traveling path 640*b* at times $\{t_3, t_2, t_1, t_0\}$, the minimum Euclidean distance 560*b* between the object 520 and the ego-vehicle 100 is below a certain threshold. That is, the shortest Euclidean ("straight line") distance between any point on the traveling path 560*b* of the object 520 and any point on the traveling path of the ego-vehicle 100 from t=−3 to t=0 is taken to be the minimum Euclidean distance. For each object 510, 520, 530, if the minimum Euclidean distance 560*a*, 560*b*, 560*c* with the ego-vehicle 100 is below the set threshold, then the object 520, 530 is deemed to be relevant for the purpose of computing the training map 455. The threshold may be set based on a number of factors such as: kinetic information (e.g., angular and linear velocity) of the object, the kinetic information of the ego-vehicle, road type (e.g. highway or local), road formation (e.g. intersection or not), historical data regarding traffic accidents, a type of the object (e.g. pedestrian or vehicle), a speed limit of the road, and a type of the ego-vehicle (e.g. sedan or truck). For example, if the object type is a pedestrian and the pedestrian object is traveling at a speed of 1 meter per second, the threshold may be set to 5 meters. For another example, if the object type is a sedan and it is traveling at a speed of 30 km/hr, the threshold may be set to 20 meters.

Next, a ground truth importance OGM 455 (also known as a ground truth OGM 455), is generated by the processing system (not shown) for each time $t_i$ in the set of n consecutive times $\{t_{-n}, t_{-n+1}, t_{-n+2} \ldots t_2, t_1, t_0\}$, based on the trajectory path of the ego-vehicle associated with the respective time $t_i$ and the trajectory path 640*b*, 640*c* for each object 520, 530 in the list of relevant objects. The ground truth OGM 455 is shown in FIG. 7 and includes: a road mask 710 represents the trajectory path of the ego-vehicle 100 associated with the respective time $t_i$, an object mask 720*a*, 720*b*, 720*c*, 720*d* for each object 730, 740, 750, 760 in the list of relevant objects, and a distance 790*a*, 790*b*, 790*c* 790*d* between the ego-vehicle 100 and each object mask 720*a*, 720*b*, 720*c*, 720*d*. In some embodiments, the road mask 710 used to represent the trajectory path of the vehicle has a width that is determined based on one or more of a number of factors such as: kinetic information (e.g. angular or linear velocity) of the ego-vehicle 100 at the timeframe $t_i$, road type (e.g. highway or local), road formation (e.g. intersection, single or multi-lane), a type of the ego-vehicle 100 (e.g. sedan or truck), and so on.

In some embodiments, an object mask 720*a*, 720*b*, 720*c*, 720*d* for a relevant object 730, 740, 750, 760 has a shape, size, radius, width or length determined based on one or more factors such as: the object type of the object, kinematic information of the object at the time $t_i$, a direction headed by the object, and so on. For example, FIG. 7 shows an oval shape being used as a shape of object mask for all objects. In other embodiments, a pedestrian object may be represented by a road mask of a circular shape while a sedan object may be represented by a road mask of a square shape.

Once a ground truth OGM 455 is generated for a given time $t_i$, the ground truth OGM can be stored in a database. A labelled training data 450 may be then be generated corresponding to each of the n consecutive times $\{t_{+n}, t_{-n+2} \ldots t_2, t_1, t_0\}$ to that includes, for each time the point cloud 251, the binary map 252, and the path command information 253 and the generated ground truth OGM. The labelled training data 455 for the n consecutive times is then stored for training the map generation module 350 as described above.

Figure 8:
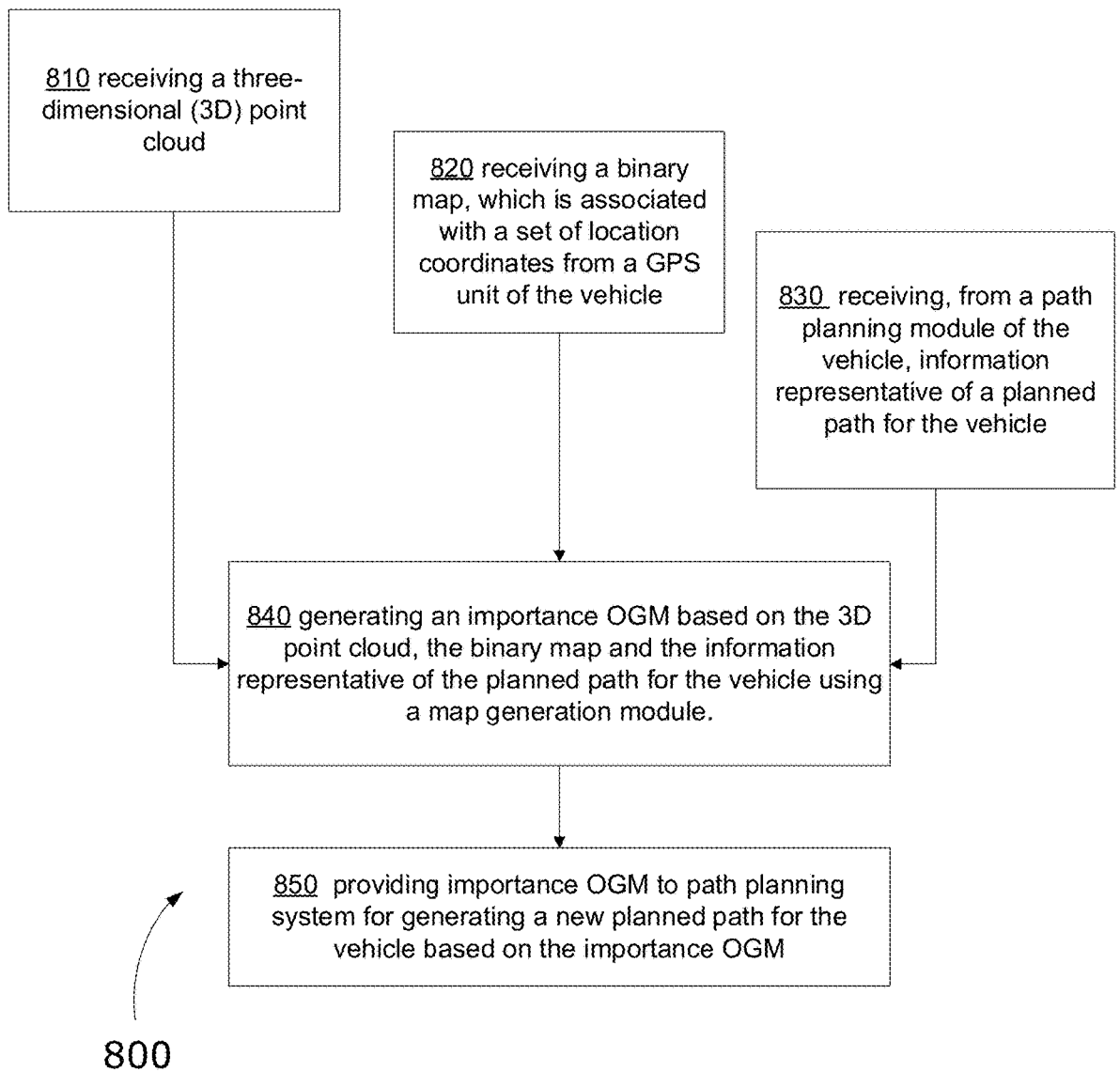
FIG. 8 is a flowchart illustrating an example method performed by the map generation module at inference for generating an importance Occupancy Grid Maps (OGM)

Referring now to FIG. 8, a flowchart illustrating an example method 800 performed by the trained map generation module 350 at inference for generating an importance OGM $M_i$ 260 is shown. The method 800 may be implemented in software executed, for example, by the processor 102 of the vehicle control system 115. Coding of the software is well within the scope of a person of ordinary skill in the art having regard to the present disclosure. The method 800 may contain additional or fewer processes then shown and described, and may be performed in a different order. The software includes computer-readable code or instructions that are executable by the processor 102 of the vehicle control system to perform the method 800.

At 810, the vehicle control system 115 receives, from a LIDAR unit 114 of the vehicle 100 (or a different sensor such as a RADAR unit or a stereo camera), a 3D point cloud 251 for a current time $t_i$.

At 820, the sub-module 360 of the map generation 350 receives a binary map 252 for the current time $t_i$ that is associated with a GPS location received from a GPS unit 119 of the vehicle 100.

At 830, the path feature extractor NN 351 with learned parameters (e.g. weights) receives, from the path planning module 174 of the vehicle 100, path command information 253 representing a planned path for the vehicle 100 for the current time $t_i$.

At 840, the map generation module 350 generates an importance OGM 260 for the current time $t_i$ based on the 3D point cloud 251, the binary map 252 and the path command information 253 as described above with respect to FIG. 4.

At 850, the importance OGM $M_i$ 260 for the current time $t_i$ is provided to the path planning system 174 which generates a new planned path for the vehicle 100 based on the one or more regions of interest in the importance OGM $M_i$ 260.

Figure 9B:
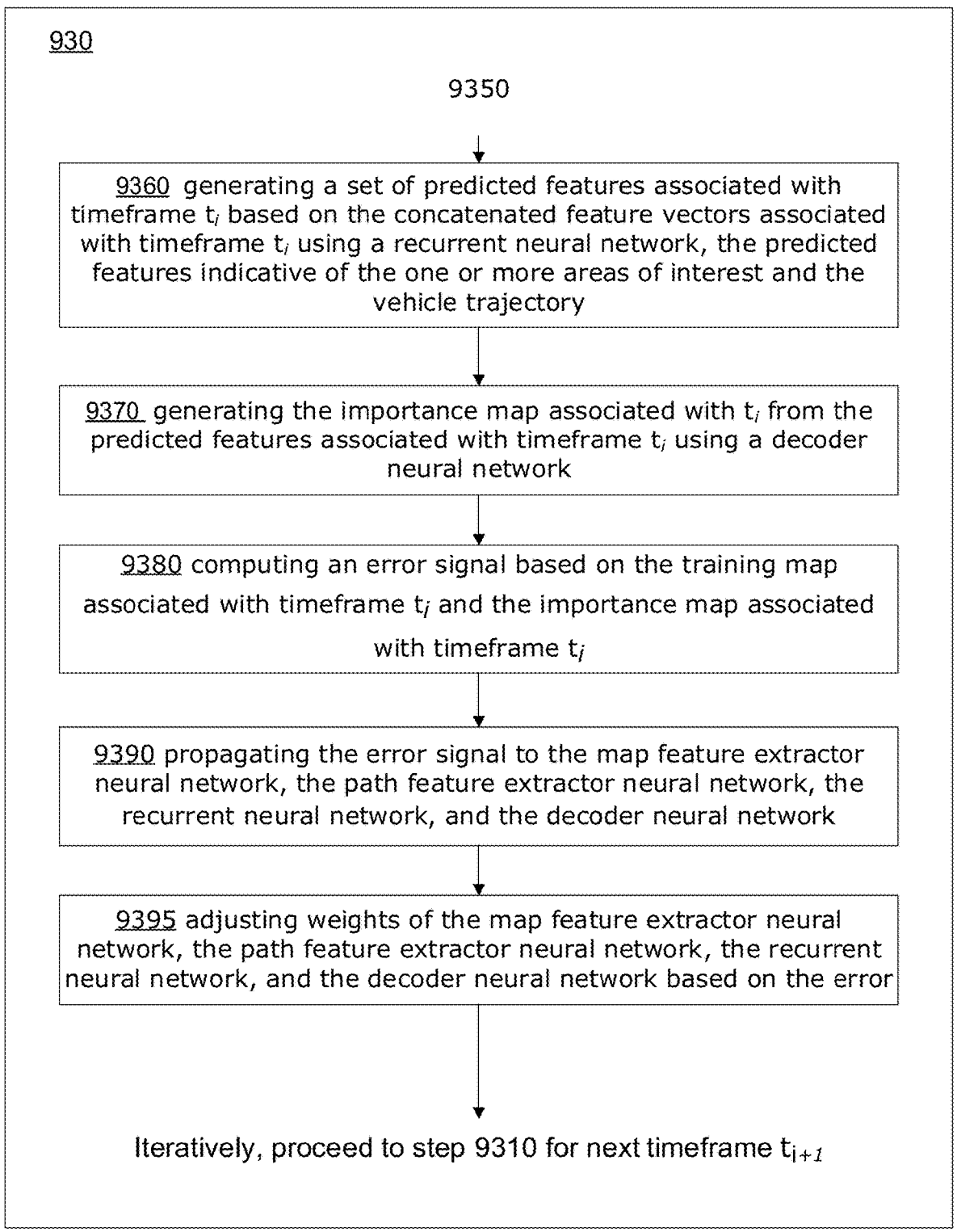

Referring to FIGS. 9A and 9B, a flowchart illustrating an example method of training the map generation module 350 using a supervised learning algorithm to learn the parameters (e.g. weights) of the plurality of neural networks 351, 353, 355, 357 of the map generation module 350 is shown.

At 910, the map generation module 350 receives a plurality of sets of input labelled training data 355 for n consecutive timeframes, where each labeled training data 450 in the set of labelled training data 355 is associated with a respective time $t_i$ in the n consecutive times $\{t_{-n}, t_{-n+1}, t_{-n+2} \ldots t_2, t_1, t_0\}$. Each labeled training data 450 includes: a 3D point cloud 251, a binary map 252, and path command information 253 representative of a planned path of a vehicle and a desired (i.e., ground truth) importance OGM 455. At 930, for each time $t_i$, where $i=\{-n, -n+1, \ldots, 2, 1, 0\}$ in the n consecutive times, the map generation module 350 generates an importance OGM $M_i$ 260 associated with timeframe $t_i$ by steps 9310 to 9390, in an iterative manner as described below.

At 9310, the sub-module 360 of the map generation module 350 receives a 3D point cloud 351 of the labelled training data 355 corresponding to the time $t_i$ and generates an input occupancy grid map (OGM) $M_L$ 254 based on the 3D point cloud 251 for the time $t_i$. At 9320, the second sub-module 363 of the map generation module 350 generates a binary OGM $M_B$ 257 for the time $t_i$ by combining the binary map 252 corresponding to time $t_i$ and the input OGM $M_L$ 254 generated for time $t_i$. At 9330, the map feature extractor NN 351 receives the binary OGM $M_B$ 257 for the time $t_i$, generates a set f map feature vectors $FV_i$, where $i=\{-n, -n+1, -n+2 \ldots 2, 1, 0\}$, and outputs the set of map feature vectors $FV_i$. Each map feature vector $FV_i$, 310 indicates one or more areas of interest based on the 3D point cloud 251.

At 9340, the path feature extractor NN 353 receives path command information 253 of the labelled training data 355 corresponding to the timeframe $t_i$ and generates a set of path feature vectors $FV'_i$ 312. The set of path feature vectors $FV_i$ 312 indicate a vehicle trajectory and the set of map feature vectors $FV_i$, 310 and the set of path feature vectors $FV'_i$ 312 have the same dimensions.

At 9350, the concatenation sub-module 365 of the map generation module 350 concatenates the set of map feature vectors $FV_i$ 310 and the set of path feature vectors $FV'_i$ 312 to obtain a set of concatenated feature vectors 313.

At 9360, the RNN 351 of the map generation module 350 generates a set of predicted features 315 based on the concatenated feature vectors 313, where the predicted features 315 indicative of the one or more areas of interest and the vehicle trajectory.

At 9370, the decoder NN 357 receives the set of predicted features 315, generates the importance OGM $M_i$ 260 for the time $t_i$ from based on the predicted features 315, and outputs the importance OGM $M_i$ 260 for the time $t_i$. At 9380, the loss-computing sub-module 370 computes an error 380 based on the ground truth OGM 455 in the labelled training data 450 corresponding to time $t_i$ and the importance OGM $M_i$ 260 for time $t_i$ output by the decoder NN 357.

At 9390, the map generation module 350 back propagates the error 380 to the map feature extractor NN 351, the path feature extractor NN 353, the recurrent NN 355, and the decoder NN 357.

At 9395, the map generation module 350 adjusts (i.e., updates or modifies) one or more parameters (e.g. weights) of each of the NNs 351, 353, 355, 357 based on the error 380 in order to optimize the NNs 351, 353, 355, 357 of the map generation module 350. The map generation module 350 then starts at step 9310 again for the next timeframe and proceeds to perform the same steps 9310-9395 for each time $t_i$ in the n consecutive times $\{t_{-n}, t_{-n+1}, t_{-n+2} \ldots t_2, t_1, t_0\}$. In some embodiments, the training of the map generation module 350 stops when the labelled training data 450 for all the times $\{t_{-n}, t_{-n+1}, t_{-n+2} \ldots t_2, t_1, t_0\}$ (i.e., all labelled training data 450 in the labelled training dataset 355) have been processed. In some embodiments, the training of the map generation module 350 stops when the error 380 has a value that is less than a threshold value, which means the generated importance OGM $M_i$ 260 is sufficiently close to the ground truth) OGM 455.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A processor-implemented method for generating an importance occupancy grid map (OGM) for controlling a vehicle, the method comprising:
receiving a 3D point cloud;
generating an input OGM based on the received 3D point cloud;
receiving a binary map, the binary map being associated with a Global Positioning System (GPS) location from a GPS unit of the vehicle;
generating a binary OGM by combining the binary map and the input OGM;
generating a set of map feature vectors indicative of one or more areas of interest using a map feature extractor neural network based on the binary OGM;
receiving, from a path planning module of the vehicle, path command information representative of a planned path for the vehicle;

generating an importance OGM based on the set of map feature vectors and the path command information representative of the planned path for the vehicle; and
controlling the vehicle based on the importance OGM.

2. The method of claim 1, wherein:
the importance OGM comprises one or more regions of interest based on the planned path of the vehicle, each of the one or more regions of interest being represented by an object mask indicative of a potential collision for the vehicle on the planned path of the vehicle.

3. The method of claim 1, further comprising providing the importance OGM to a path planning module of the vehicle for generating a new planned path for the vehicle based on the one or more regions of interest in the importance OGM.

4. The method of claim 1, wherein the importance OGM comprises a road mask determined based on the planned path of the vehicle and the road mask has a width correlated to an angular velocity or a speed of the vehicle.

5. The method of claim 1, further comprising:
generating a set of path feature vectors indicative of a vehicle trajectory using a path feature extractor neural network, wherein the set of map feature vectors and the set of path feature vectors have the same dimension; and
concatenating the set of map feature vectors and the set of path feature vectors to obtain a set of concatenated feature vectors.

6. The method of claim 5, further comprising:
generating a set of predicted features based on the concatenated feature vectors using a recurrent neural network, the predicted features indicative of the one or more areas of interest and the vehicle trajectory.

7. The method of claim 5, further comprising generating the importance OGM from the predicted features using a decoder neural network.

8. The method of claim 1, wherein the planned path information representative of the planned path comprises an angular velocity and a speed of the vehicle.

9. The method of claim 1, wherein generating the input OGM is based on at least one of: a height value of a bin or polygon enclosing a group of points in the 3D point cloud, an average height value of one or more columns of points in the 3D point cloud, an intensity value of each of one or more points in the 3D point cloud, a range of values based on one or more height values of one or more points in the 3D point cloud, a point density value of one or more points in the 3D point cloud.

10. A processor-implemented method for training a map generation module to generate an importance occupancy grid map (OGM) based on a point cloud, a binary map, and path command information, the processor-implemented method comprising:
receiving a set of labelled training data for n consecutive times $\{t_{-n}, t_{-n+1}, t_{-n+2} \ldots t_2, t_1, t_0\}$, the set of labelled training data comprising labelled training data corresponding to each time $t_i$ in the n consecutive times, each labelled training data comprising a 3D point cloud, a binary map, path command information representative of a planned path of a vehicle, and a ground truth importance OGM;
for each time $t_i$, where i=$\{-n, -n+1, \ldots, 2, 1, 0\}$ in the n consecutive times, providing labelled training data corresponding to time $t_i$ to the map generation module to train the map generation module by:
generating an input occupancy grid map (OGM) based on the 3D point cloud included in the labelled training data corresponding to time $t_i$;
generating a binary OGM by combining the binary map included in the labelled training data corresponding to time $t_i$ and the input OGM;
generating a set of map feature vectors associated with time $t_i$ indicative of one or more areas of interest using a map feature extractor neural network;
generating, based on the path command information representative of a planned path of the vehicle included in the labelled training data corresponding to time $t_i$, a set of path feature vectors associated with time $t_i$ using the path feature extractor neural network, wherein the set of path feature vectors indicate a vehicle trajectory, and wherein the set of map feature vectors and the set of path feature vectors have the same dimensions;
concatenating the set of map feature vectors associated with time $t_i$ and the set of path feature vectors associated with time $t_i$ to obtain a set of concatenated feature vectors associated with time $t_i$;
generating a set of predicted features associated with time $t_i$ based on the concatenated feature vectors associated with time $t_i$ using a recurrent neural network, the predicted features indicative of the one or more areas of interest and the vehicle trajectory;
generating an importance OGM associated with $t_i$ from the predicted features associated with time $t_i$ using a decoder neural network;
computing an error signal based on the ground truth OGM included in the labelled training data corresponding to time $t_i$ and the importance map associated with time $t_i$; and
backpropagating the error signal to the map feature extractor neural network, the path feature extractor neural network, the recurrent neural network, and the decoder neural network to adjust parameters of the map feature extractor neural network, the path feature extractor neural network, the recurrent neural network, and the decoder neural network.

11. The method of claim 10, wherein the path command information representative of the planned path comprises an angular velocity and a speed of the vehicle.

12. The method of claim 10, wherein generating the input OGM is further based on the path command information included in the in the labelled training data corresponding to time $t_i$, the path command information including at least one of: information indicative of a height value of a bin or polygon enclosing a group of points in the 3D point cloud associated with time $t_i$, information indicative of an average height value of one or more columns of points in the 3D point cloud associated with time $t_i$, information indicative of an intensity value of each of one or more points in the 3D point cloud associated with time $t_i$, information indicative of a range of values based on one or more height values of one or more points in the 3D point cloud associated with time $t_i$, information indicative of a point density value of one or more points in the 3D point cloud associated with time $t_i$.

13. A processor-implemented method for generating ground truth importance occupancy grid maps (OGMs), the processor-implemented method comprising:
receiving a plurality of 3D point clouds, each of the plurality of 3D point clouds being associated with a respective time in a set of consecutive times, and each of the plurality of 3D point clouds comprises one or more objects;

processing the plurality of 3D point clouds to obtain a unique object ID and an object type for each of the one or more objects;

receiving a plurality of GPS locations of a vehicle, each of the plurality of GPS coordinates being generated at a respective time in the set of consecutive times;

receiving a plurality of binary maps, each of the plurality of binary maps being associated with a respective time in the set of consecutive times and based on the GPS coordinate of the vehicle at the respective time;

for each respective time in the set of consecutive time, generating an object map based on the 3D point cloud associated with the respective time, wherein the object map comprises a representation for each of the one or more objects;

for each of the one or more objects, generating a trajectory map associated with the unique object ID for said object across all the times in the set of consecutive times based on the object map associated with each time in the set of consecutive times, wherein the trajectory map comprises each instance of the object across all the times in the set of consecutive times, wherein each instance of the object is generated based on a GPS location of the object at a respective time in the set of consecutive time;

determining a trajectory path for each of the one or more objects based on the trajectory map of the object;

generating a list of relevant objects for the vehicle based on the trajectory paths of the one or more objects;

for each respective time in the set of consecutive times, generating a trajectory map for the vehicle comprising a trajectory path of the vehicle, the trajectory path of the vehicle being determined based on the binary map associated with the respective time and the GPS locations of the vehicle associated with the respective time, wherein the trajectory path of the vehicle is represented using a road mask;

for each respective time in the set of consecutive time, generating a ground truth importance OGM based on the trajectory path of the vehicle associated with the respective time and the trajectory path for each object in the list of relevant objects, wherein the ground truth importance OGM comprises: the road mask representing the trajectory path of the vehicle associated with the respective time, an object mask for each object in the list of relevant objects, and a distance between the vehicle in the trajectory path of the vehicle and each object mask for each object in the list of relevant objects.

14. The method of claim 13, wherein the list of relevant objects comprises at least one object from the one or more objects, wherein the at least one object, across the set of consecutive times, has a minimum Euclidean distance with the vehicle and the minimum Euclidean distance is greater than a pre-determined threshold.

15. The method of claim 13, wherein the road mask used to represent the trajectory path of the vehicle has a width that is determined based on one or more of: a road type of the trajectory path, a velocity of the vehicle, and a type of the vehicle.

16. The method of claim 13, wherein the object mask for each object in the list of relevant objects has a shape, size, radius, width or length determined based on a kinematic information of the object.

* * * * *

UNITED STATES PATENT AND TRADEMARK OFFICE
CERTIFICATE OF CORRECTION

PATENT NO. : 11,815,897 B2
APPLICATION NO. : 16/871711
DATED : November 14, 2023
INVENTOR(S) : Amirhosein Nabatchian and Ehsan Taghavi It is certified that error appears in the above-identified patent and that said Letters Patent is hereby corrected as shown below:

In the Specification

In Column 14, Line 17 "1013" should read --10B--.

In Column 17, Line 12 "and to being the most recent time" should read --and $t_0$ being the most recent time--.

In Column 19, Line 15 "may be pre-trained trained to learn the parameters of the" should read --may be pre-trained to learn the parameters of the--.

Signed and Sealed this
Eighteenth Day of June, 2024

Katherine Kelly Vidal
*Director of the United States Patent and Trademark Office*